(12) United States Patent
Sirichai et al.

(10) Patent No.: US 12,143,138 B2
(45) Date of Patent: Nov. 12, 2024

(54) CASE FOR A MOBILE COMMUNICATIONS DEVICE WITH ACCESSORY ACCESS WINDOW

(71) Applicant: World Richman Manufacturing Corporation, Elgin, IL (US)

(72) Inventors: Saharut Sirichai, Bangkok (TH); Michael Liu, FoShan (CN)

(73) Assignee: World Richman Manufacturing Corporation, Elgin, IL (US)

( * ) Notice: Subject to any disclaimer, the term of this patent is extended or adjusted under 35 U.S.C. 154(b) by 262 days.

(21) Appl. No.: 17/525,356

(22) Filed: Dec. 7, 2021

(65) Prior Publication Data

US 2022/0158678 A1 May 19, 2022

Related U.S. Application Data

(60) Provisional application No. 63/140,803, filed on Jan. 23, 2021.

(51) Int. Cl.
*H04B 1/3888* (2015.01)

(52) U.S. Cl.
CPC ................... *H04B 1/3888* (2013.01)

(58) Field of Classification Search
CPC .. H04B 1/3888; H04B 1/3816; H04B 1/3883; H04B 1/03; A45C 11/182; A45C 1/06; A45C 13/02; A45C 2200/15; A45C 13/002

See application file for complete search history.

(56) References Cited

U.S. PATENT DOCUMENTS

| | | | | |
|---|---|---|---|---|
| 9,678,537 B2 * | 6/2017 | Kupferstein | ......... | F16M 13/022 |
| 2018/0042350 A1 * | 2/2018 | Rajeswaran | .............. | A45F 5/00 |
| 2019/0208879 A1 * | 7/2019 | Gawley | ................ | A45C 11/182 |
| 2021/0013918 A1 * | 1/2021 | Kim | ..................... | H04B 1/3888 |

OTHER PUBLICATIONS

KR 200492377 Y1, Wonyong, Vehicle mountable smartphone case, pp. 1-4 (Year: 2020).*

* cited by examiner

*Primary Examiner* — Keith Ferguson
(74) *Attorney, Agent, or Firm* — Christopher J. Scott

(57) ABSTRACT

A casing or case assembly for a mobile communications device case provides a primary device-receiving body formation. At the posterior portions of the primary device-receiving body formation is an accessory access window. The accessory access window is configured to allow a user to interface a charging device with the mobile communications device as received in the primary device-receiving body formation in anterior adjacency to an optional posterior panel portion. The accessory access window is of sufficient dimension to receive a charger device with a device diameter that fits within the window. A number of accessories, in addition to a charger device, are attachable to the mobile communications device via the accessory access window. Certain exemplary accessories include a cover panel, a wallet accessory, and a vehicular mount mechanism. At least one secondary body formation may be affixed to the primary device-receiving body formation as an outer skin thereof.

20 Claims, 25 Drawing Sheets

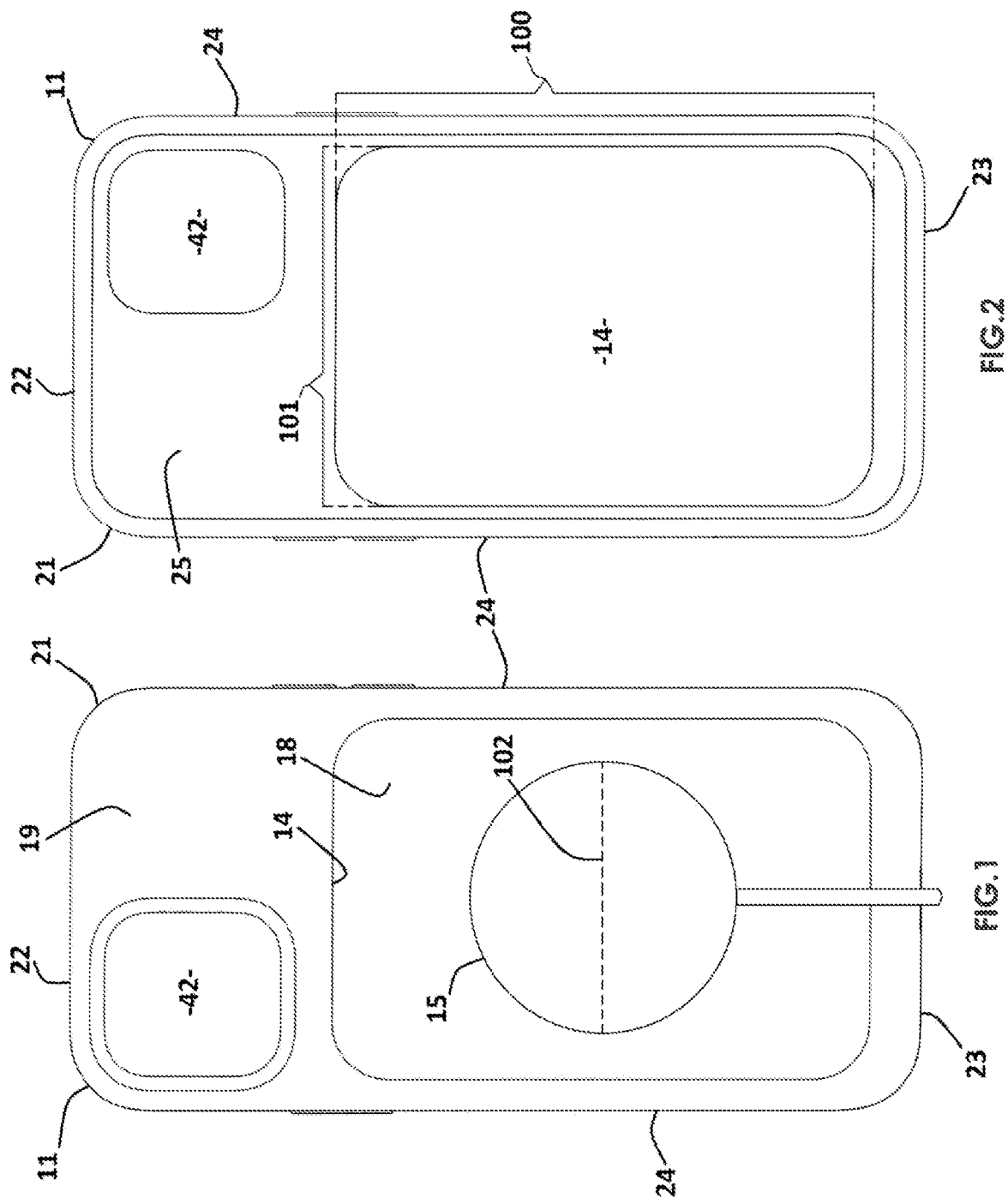

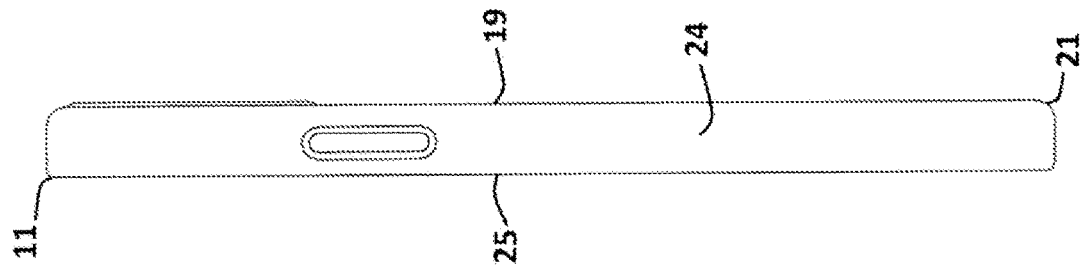
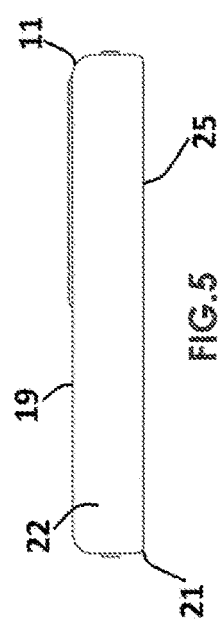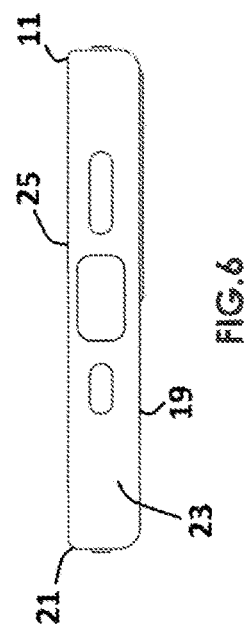
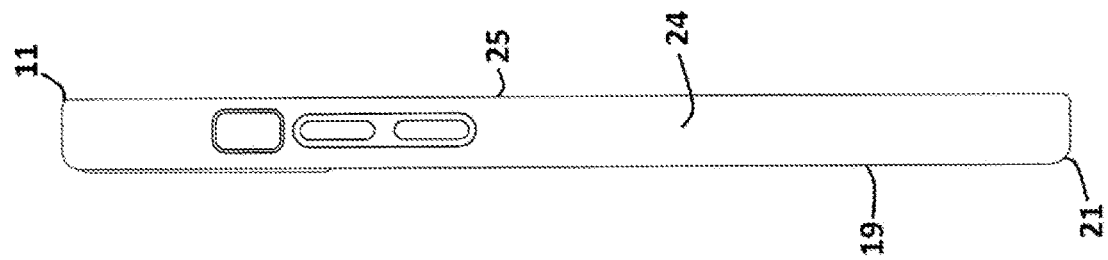

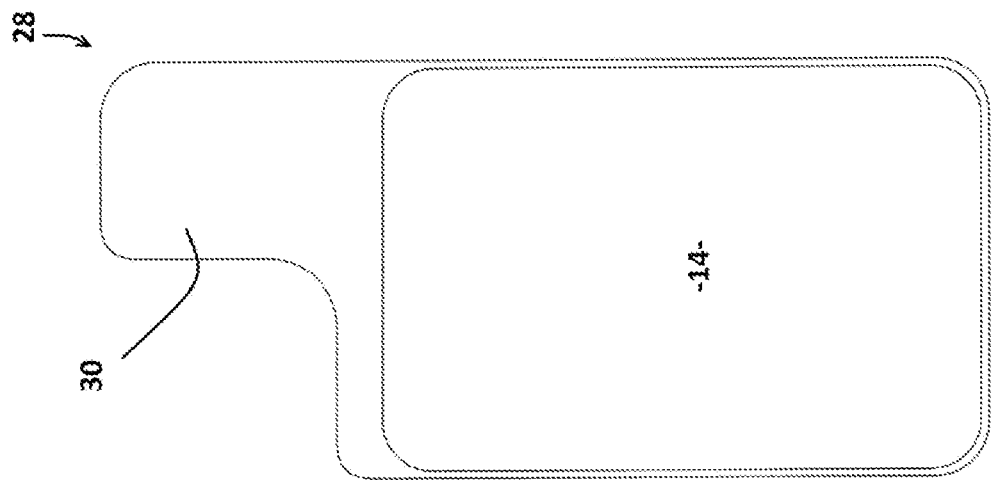
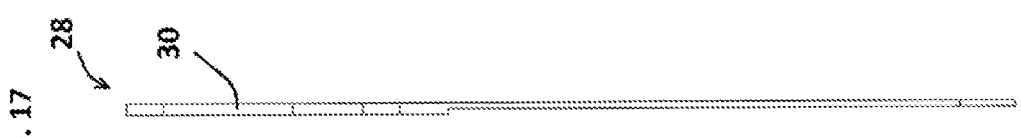
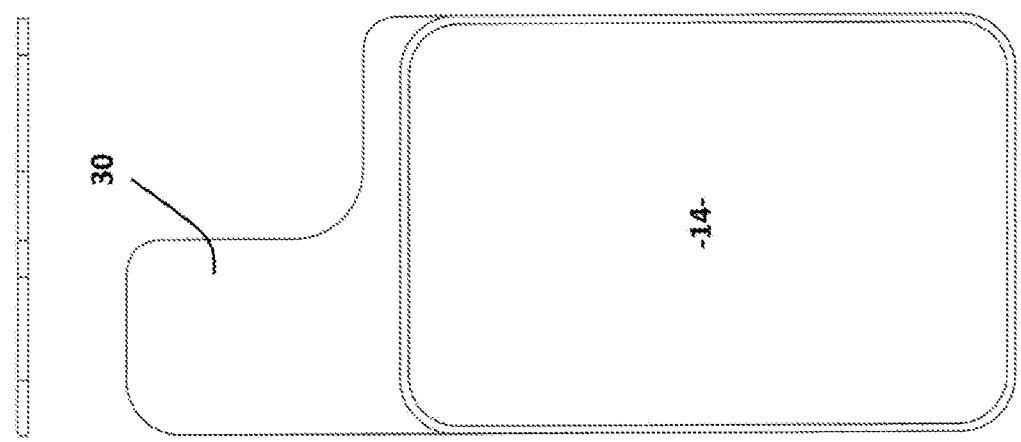
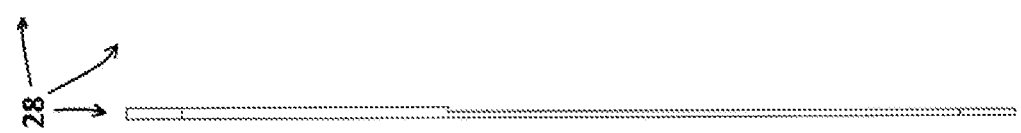

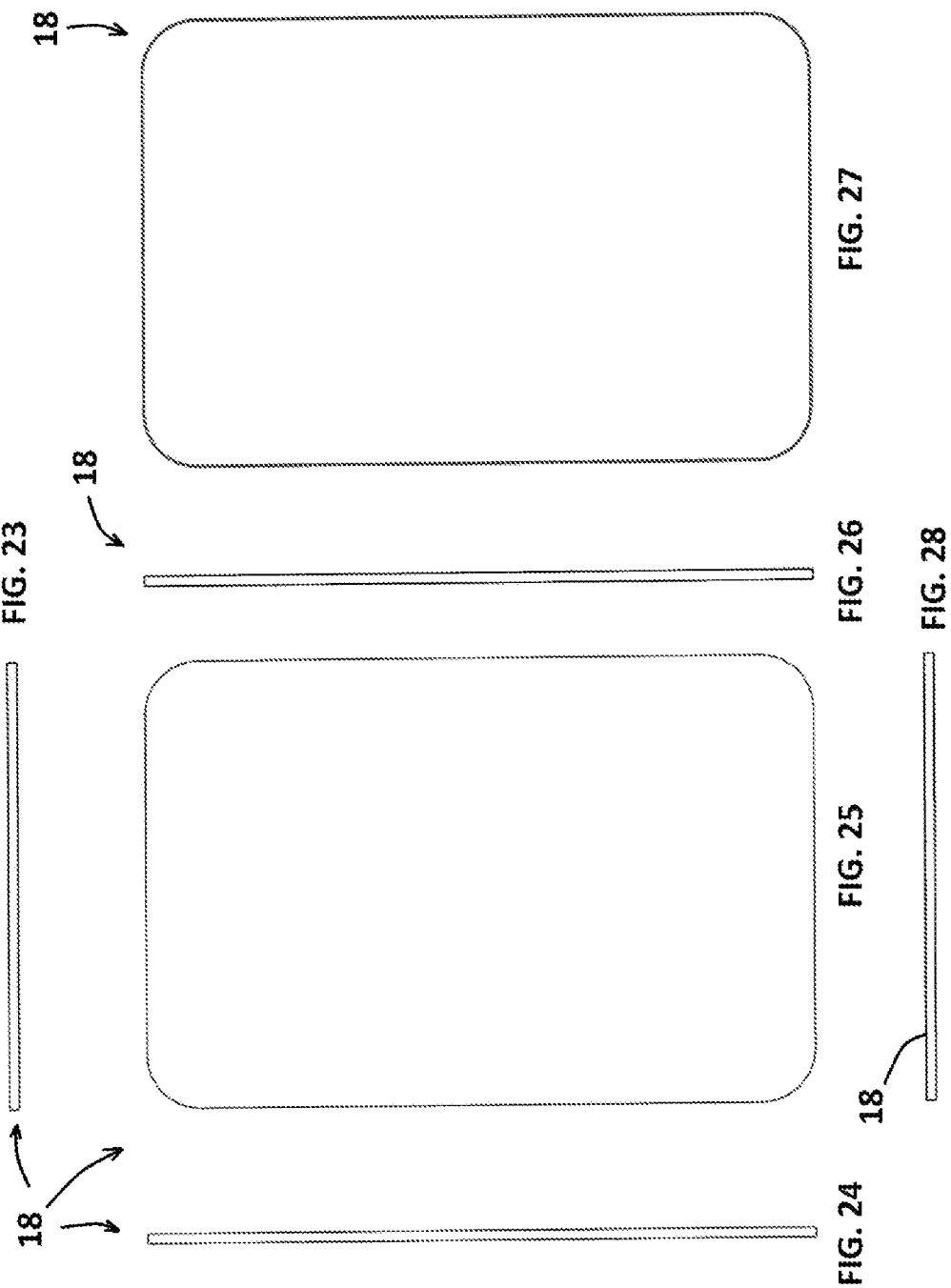

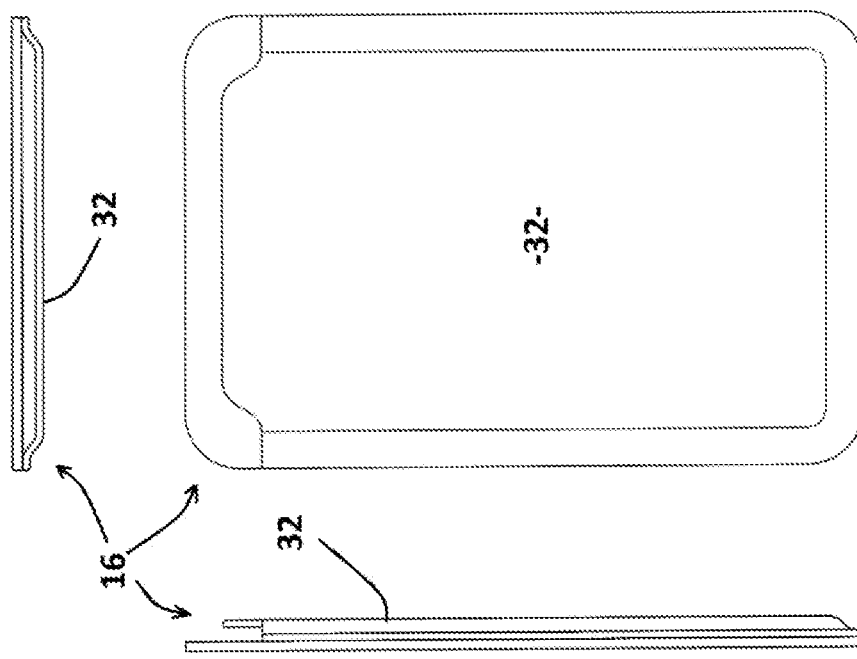

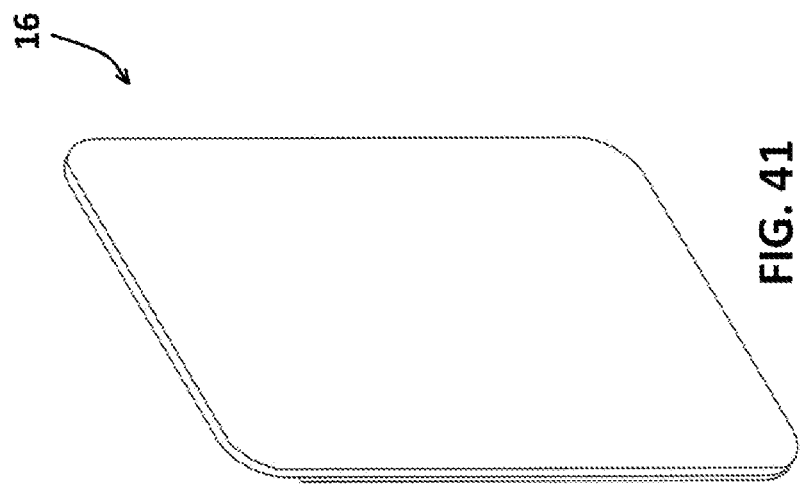
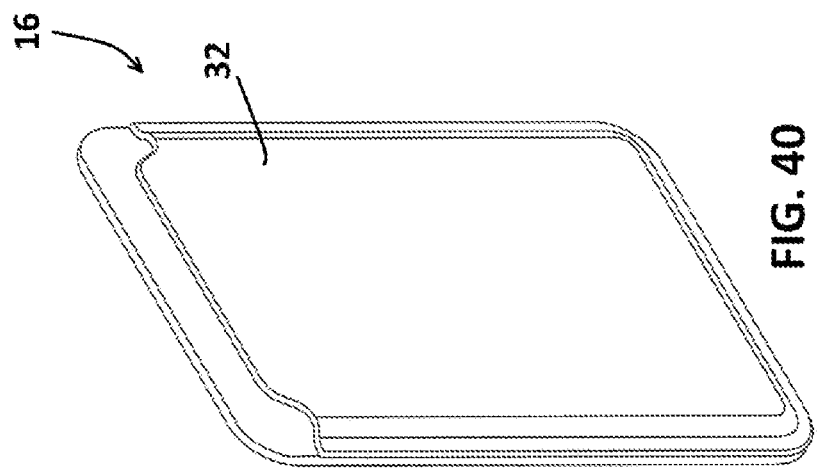

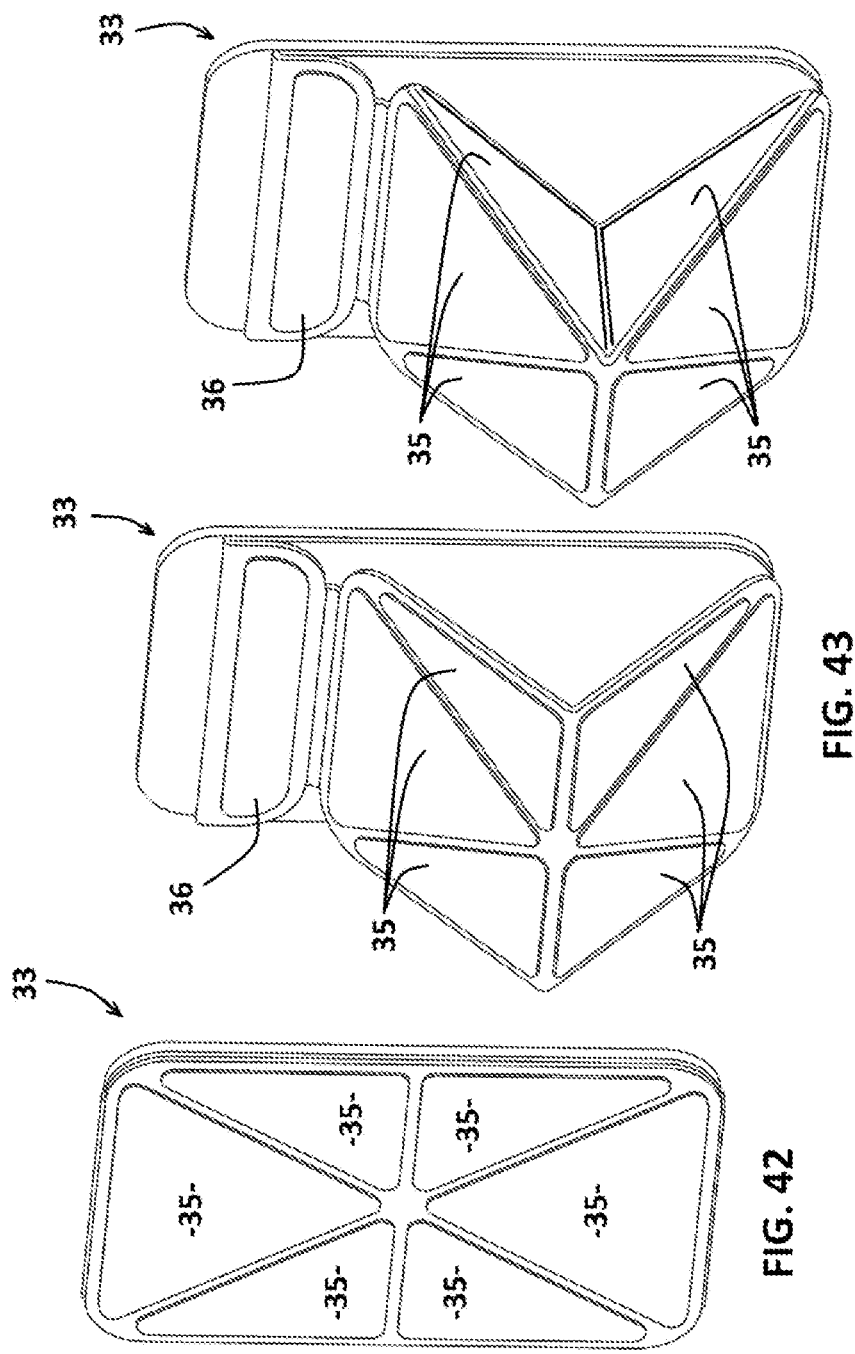

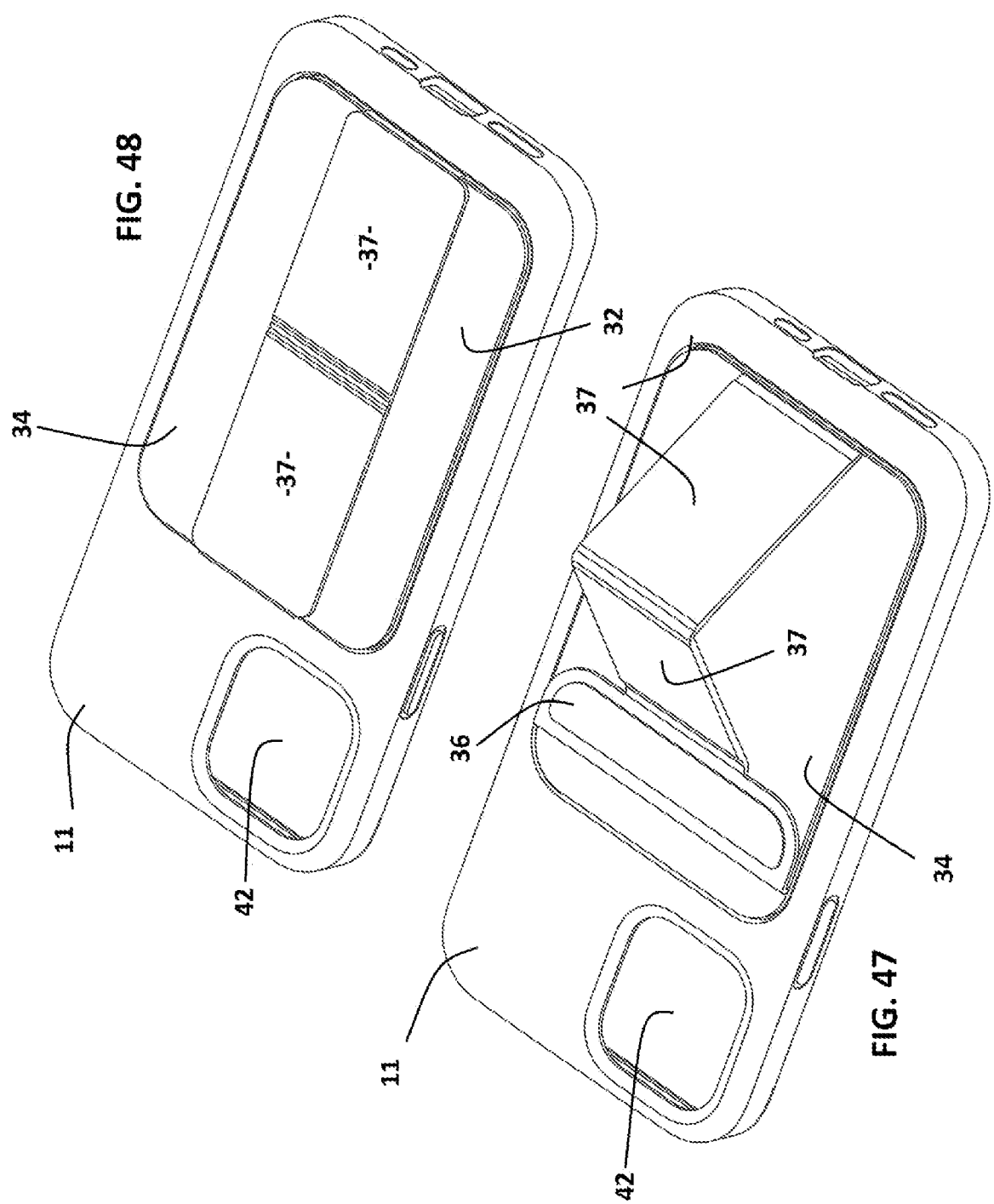

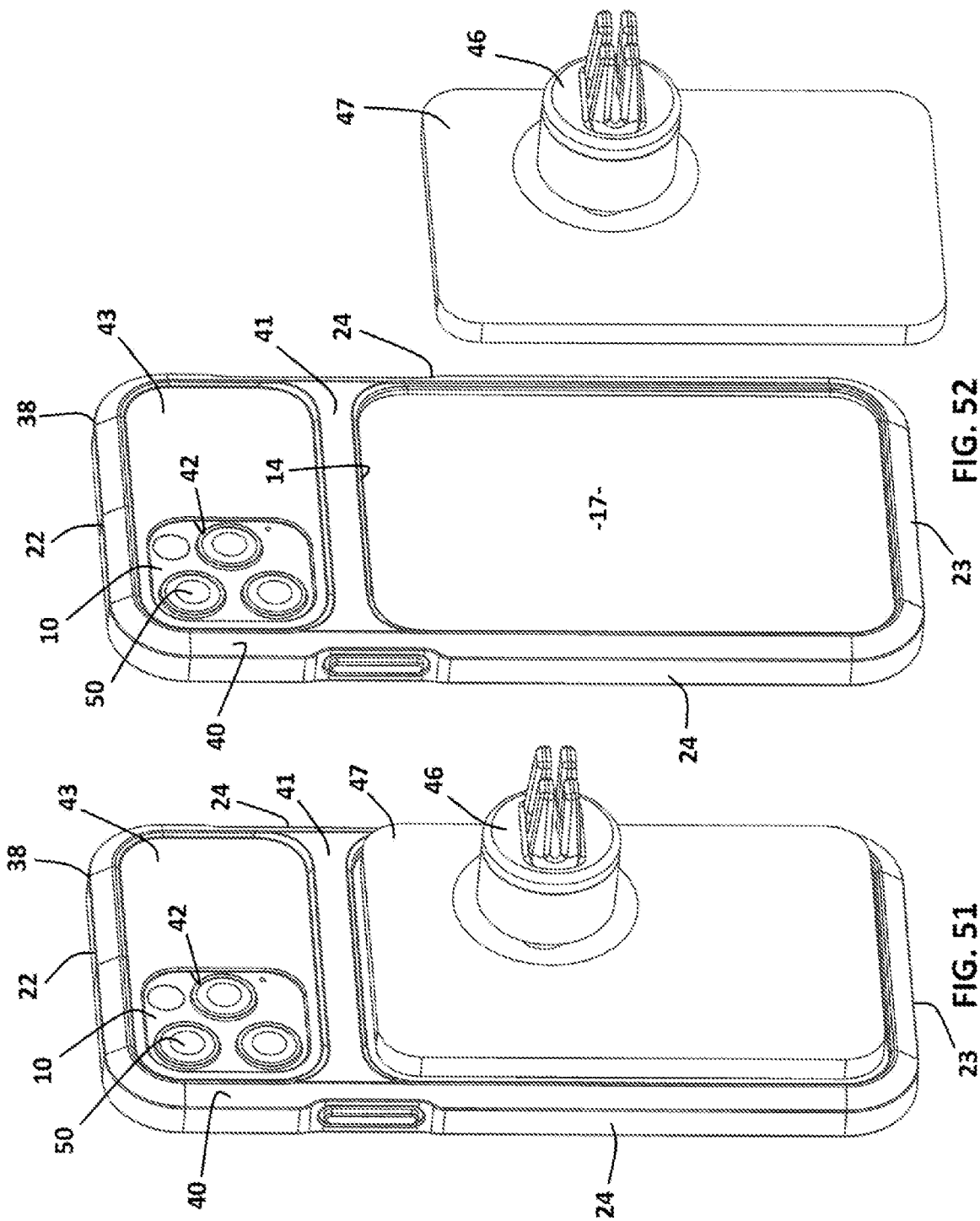

CASE FOR A MOBILE COMMUNICATIONS DEVICE WITH ACCESSORY ACCESS WINDOW

PRIOR HISTORY

This application claims the benefit of the following U.S. Provisional Patent Applications: U.S. Provisional Patent Application No. 63/113,842 filed in the United States Patent and Trademark Office (USPTO) on 14 Nov. 2020; U.S. Provisional Patent Application No. 63/114,989 filed in the USPTO on 17 Nov. 2020; U.S. Provisional Patent Application No. 63/115,099 filed in the USPTO on 18 Nov. 2020; U.S. Provisional Patent Application No. 63/120,676 filed in the USPTO on 2 Dec. 2020; and U.S. Provisional Patent Application No. 63/140,803 filed in the USPTO on 23 Jan. 2021, the specifications and drawing content of which applications are incorporated herein by reference.

FIELD OF THE INVENTION

The present invention generally relates to a case or case assembly for use with a mobile communications device. More particularly, the present invention relates to a case assembly for outfitting a mobile communications device and further enabling the user to charge the mobile communications device by way of a charger device attachable to the posterior surface of the mobile communications device via an accessory access window provided by the case assembly.

SUMMARY OF THE INVENTION

The present invention provides a case for a mobile communications device exemplified by a smart phone or tablet type computer. The state of the art in mobile communications devices is beginning to teach any number of accessories that operate in conjunction with these devices, and most recently provide magnetically or adhesively attachable accessories that are removably attached to a posterior surface of the devices. When accessories such as a charger device and/or a card-carrying wallet are attached to the posterior surface of a mobile communications device, the overall thickness of the ensemble necessarily increases. The thickness of a device-protective case increases this overall thickness in a degree on par with the thickness of the case material.

The present invention basically provides a number of structurally similar cases or case assemblies having a device-receiving formation that provides an accessory access window dimensioned for allowing accessory articles to be directly attached to the posterior surface of the mobile communications device via the accessory access window. Optionally, in all embodiments, a removable cover or panel is attachable to the accessory access window for effectively closing or covering the window and rendering the posterior surface or posterior device-protecting portion of the outfitted embodiment more planar in parallel relation to the posterior surface of the mobile communications device and protective thereof.

The central structural concept around which these specifications are directed concern cases having a cutout or accessory access window formed in the back of the cases. Accessories, as exemplified by a magnetically or adhesively attachable charger devices, wallet accessories, and case-mount mechanisms, may be received within or at the accessory access window or cutout while the mobile communications device is received in the case. The overall thickness of the ensemble is thereby reduced by eliminating the thickness of case material at the accessory access window. Additionally, the cutout or accessory access window helps prevent inadvertent removal of the accessory from the posterior surface of the mobile communications device by preventing direct access to the edges of the accessory as received at the window.

The basic invention may be said to essentially teach or disclose a casing or case assembly for a mobile communications device case. In a first aspect, the case assembly according to the present invention preferably comprises a primary device-receiving body formation, and a posterior panel portion or accessory window insert element. The primary device-receiving body formation comprises a top portion, a bottom portion, laterally opposed side portions, an anterior device-receiving portion, and a posterior device-protecting portion. The posterior panel portion or accessory window insert is positioned at the posterior device-protecting portion and comprises an accessory access window. The accessory access window is configured to primarily allow a user to interface a charging device with the mobile communications device as received in the device-receiving body formation in anterior adjacency to the posterior panel portion or accessory window insert element.

The case assembly may further preferably comprise an assembly accessory configured to cover or close the accessory access window. In this regard, a cover or panel element, various wallet accessories; and a vehicular case-mount may all exemplify an assembly accessory according to the present invention. When exemplified by the cover or panel, the assembly accessory may be said to allow the charger device to charge the mobile communications device via a material construction of the assembly accessory. In other words, the charger device may be magnetically attached to the panel and be operable to charge the communications device via the panel. The panel is also removable so as to directly place the charger device into contact with the posterior surface of the mobile communications device.

The posterior panel portion and the assembly accessory may be preferably formed from visually identical or complementary material(s). The visually identical or complementary material(s) provide a uniform or appealing visual appearance of the mobile communications device case assembly when viewed posteriorly. The device-receiving body formation and the assembly accessory may also be formed from visually identical or complementary material(s) for providing a uniform or visually appealing appearance of the mobile communications device case assembly when viewed posteriorly. When exemplified by a wallet accessory, the assembly accessory preferably comprises a pocket formation. The pocket formation enables the user to store at least one article (e.g. a credit card) in adjacency to the accessory access window thereby enhancing the functionality of the assembly.

When the assembly accessory is exemplified by certain wallet accessories, the assembly accessory may be said to also provide a kickstand feature. The kickstand feature enables the user to display the mobile communications device as received within the device-receiving body formation at an oblique angle relative to a support surface. The kickstand feature may further enable the user to display the mobile communications device in either a landscape orientation or a portrait orientation. At least one embodiment of the case assembly according to the present invention provides at least one secondary body formation. The at least one secondary body formation is preferably configured to receive the primary device-receiving body formation as an outer skin thereof for further accessorizing the case assembly.

The case assembly may also be used in combination with a case mount with a particular view toward providing a vehicular-based case mount mechanism. The case mount preferably comprises a window interface portion, which window interface of the case mount closes the accessory access window and is operable to mount the case assembly to a support structure exemplified by a vehicular vent or similar other vehicular support structure. The case assembly may further preferably comprise at least one thin film panel for providing scratch resistance protection to the mobile communications device. The at least one thin film panel is attachable to the primary device-receiving body formation at the anterior device-receiving portion for interfacing intermediate articles received at the accessory access window and the posterior surface of the mobile communications device as also received at the anterior device-receiving portion.

BRIEF DESCRIPTION OF THE DRAWINGS

Other features and objectives of the invention will become more evident from a consideration of the following brief descriptions of patent drawings.

FIG. 1 is a posterior plan view of a first preferred embodiment of a first preferred mobile communications device case assembly according to the present invention shown with a charger device superimposed over a removable cover or panel element.

FIG. 2 is an anterior plan view of the first preferred embodiment of the device-receiving body formation of the first preferred mobile communications device case assembly according to the present invention shown with a removable cover or panel element removed thereby exposing an accessory access window.

FIG. 3 is a first lateral edge view of the first preferred embodiment of the first preferred mobile communications device case assembly according to the present invention.

FIG. 4 is a second lateral edge view of the first preferred embodiment of the first preferred mobile communications device case assembly according to the present invention.

FIG. 5 is a top edge view of the first preferred embodiment of the first preferred mobile communications device case assembly according to the present invention.

FIG. 6 is a bottom edge view of the first preferred embodiment of the first preferred mobile communications device case assembly according to the present invention.

FIG. 17 is a top edge view of the posterior panel portion of the third preferred mobile communications device case assembly according to the present invention.

FIG. 18 is a first lateral edge view of the posterior panel portion of the third preferred mobile communications device case assembly according to the present invention.

FIG. 19 is a posterior plan view of the posterior panel portion of the third preferred mobile communications device case assembly according to the present invention.

FIG. 20 is a second lateral edge view of the posterior panel portion of the third preferred mobile communications device case assembly according to the present invention.

FIG. 21 is an anterior plan view of the posterior panel portion of the third preferred mobile communications device case assembly according to the present invention.

FIG. 22 is a bottom edge view of the posterior panel portion of the third preferred mobile communications device case assembly according to the present invention.

FIG. 23 is a top edge view of a removable panel usable in combination with all mobile communications device case assemblies according to the present invention.

FIG. 24 is a first lateral edge view of the removable panel usable in combination with all mobile communications device case assemblies according to the present invention.

FIG. 25 is a posterior plan view of the removable panel usable in combination with all mobile communications device case assemblies according to the present invention.

FIG. 26 is a second lateral edge view of the removable panel usable in combination with all mobile communications device case assemblies according to the present invention.

FIG. 27 is an anterior plan view of the removable panel usable in combination with all mobile communications device case assemblies according to the present invention.

FIG. 28 is a bottom edge view of the removable panel usable in combination with all mobile communications device case assemblies according to the present invention.

FIG. 34 is a top edge view of the first wallet accessory according to the present invention.

FIG. 35 is a first lateral edge view of the first wallet accessory according to the present invention.

FIG. 36 is a posterior plan view of the first wallet accessory according to the present invention.

FIG. 37 is a second lateral edge view of the first wallet accessory according to the present invention.

FIG. 38 is an anterior plan view of the first wallet accessory according to the present invention.

FIG. 39 is a bottom edge view of the first wallet accessory according to the present invention.

FIG. 40 is an anterior top perspective view of the first wallet accessory according to the present invention.

FIG. 41 is a posterior top perspective view of the first wallet accessory according to the present invention.

FIG. 42 is a posterior top perspective view of a second wallet accessory according to the present invention shown in a first condition of use.

FIG. 43 is a posterior top perspective view of the second wallet accessory according to the present invention shown in a second condition of use.

FIG. 44 is a posterior top perspective view of the second wallet accessory according to the present invention shown in a third condition of use.

FIG. 47 is a posterior bottom perspective view of a third wallet accessory according to the present invention shown in a first condition of use.

FIG. 48 is a posterior bottom perspective view of the third wallet accessory according to the present invention shown in a second condition of use.

FIG. 51 is a perspective view of a fourth preferred mobile communications device case assembly encasing a mobile communications device with car vent mount accessory attached thereto via an accessory access window of the fourth preferred mobile communications device case assembly.

FIG. 52 is a perspective view of the fourth preferred mobile communications device case assembly encasing a mobile communications device with car vent mount accessory exploded therefrom to show the accessory access window more clearly.

DETAILED DESCRIPTION OF THE PREFERRED EMBODIMENTS

Figure 7:
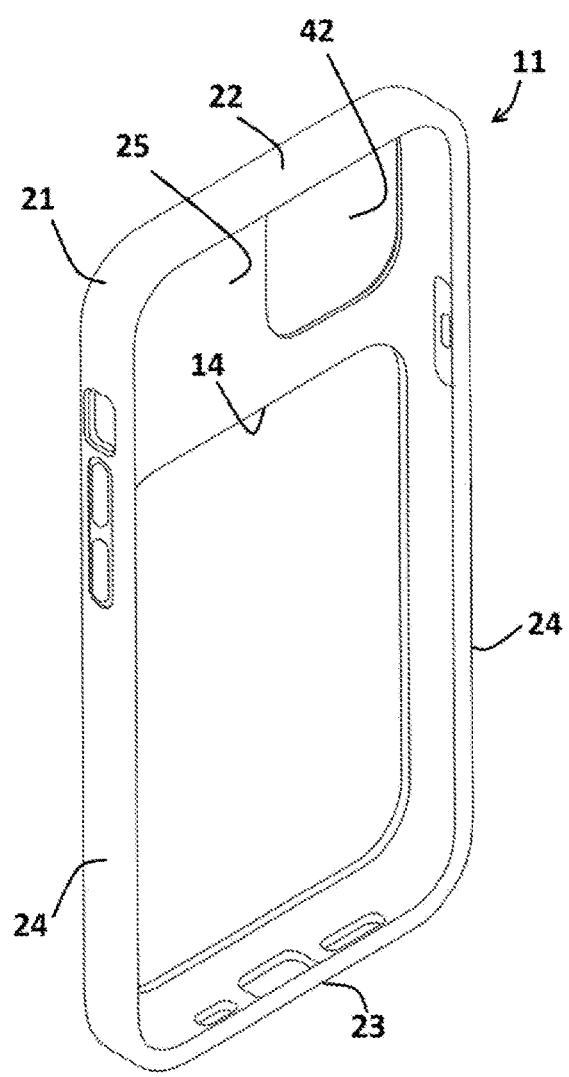
FIG. 7 is an anterior top view of the first preferred embodiment of the device-receiving body formation of the first preferred mobile communications device case assembly according to the present invention.
Figure 8:
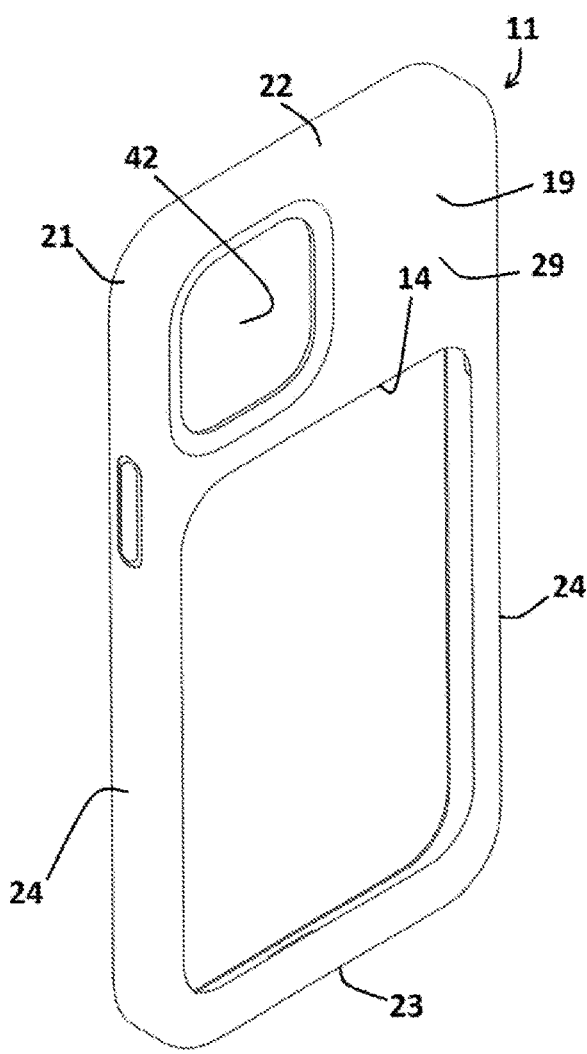
FIG. 8 is a posterior top view of the first preferred embodiment of the device-receiving body formation of the first preferred mobile communications device case assembly according to the present invention.

The present invention provides a case for a mobile communications device as at 10. The mobile communications device 10 according to the present invention may be preferably exemplified by a smart phone, tablet type computer, or similar other device. It is noted the state-of-the-art in mobile communications devices is beginning to teach any number of accessories that operate in conjunction with these devices, and most recently provide magnetically or adhesively attachable accessories that are removably attached to a posterior surface of the devices. When accessories such as a charger device and/or a card-carrying wallet accessory are attached to the posterior surface 17 of a mobile communications device 10, the overall thickness of the ensemble necessarily increases. The thickness of a device-protective case normally increases this overall thickness in a degree on par with the thickness of the case material.

The present invention basically provides a number of iterative basic case or case assembly formations. Each of the cases or case assemblies discussed below preferably have or comprise an accessory access window as at 14 dimensioned for allowing accessories to be directly attached to the posterior surface 17 of the mobile communications device 10 via the accessory access window 14 when a mobile communications device 10 is outfitted with one of cases or case assemblies described hereinafter.

The various accessories may be exemplified by a disc-like charger device as at 15 (further exemplified by the MagSafe wireless power transfer and accessory-attachment standard developed by Apple Inc. for its iPhone and AirPods product lines) or a wallet device or wallet accessory as generically depicted and referenced at 16. A further accessory may include a vehicular mount mechanism as at 46 for mounting the encased mobile communications device 10 to a vehicular support structure, such as a vent, for example.

A first preferred embodiment of the casing or case assembly according to the present invention is generally depicted and referenced at 11. A removable cover or panel element 18 is attachable to an accessory access window 14 formed in a primary device-receiving body formation 21 of the casing 11. Removable cover or panel element 18 is generally depicted and referenced in FIG. 23-30. The primary device-receiving body formation 21 essentially acts as a first layer of protective skin for the mobile communications device 10 and preferably comprises a top portion 22, a bottom portion 23, laterally opposed side portions 24, an anterior device-receiving portion 25, and a posterior device-protecting portion as at 19.

The removable cover or panel element 18 effectively closes or covers the accessory access window 14. The cover or panel element 18 preferably attaches to the accessory access window 14 by being similarly dimensioned so that a snap tight attachment holds the panel element 18 in place at the accessory access window 14. This assemblage renders the posterior surface or posterior device-protecting portion 19 of the first alternative embodiment 11 more uniformly planar in parallel relation to the posterior surface 17 of the mobile communications device 10 and protective thereof when the casing 11 outfits the mobile communications device 10.

Figure 10:
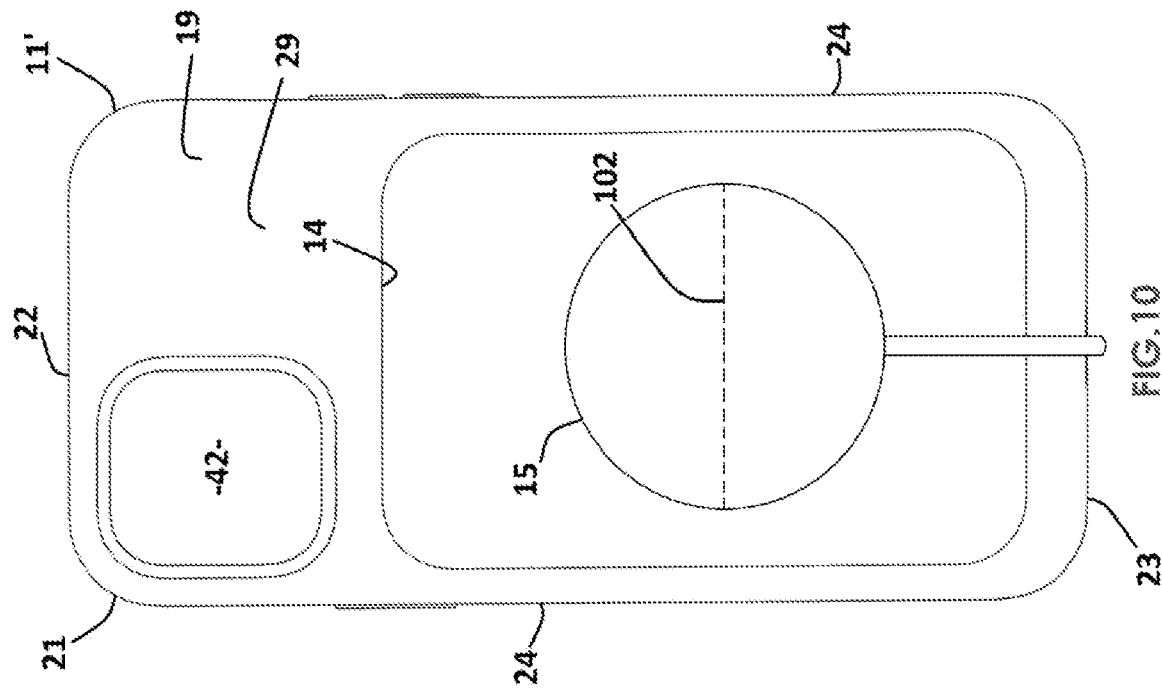
FIG. 10 is a posterior plan view of the second preferred embodiment of a device-receiving body formation of the second preferred mobile communications device case assembly according to the present invention.
Figure 9:
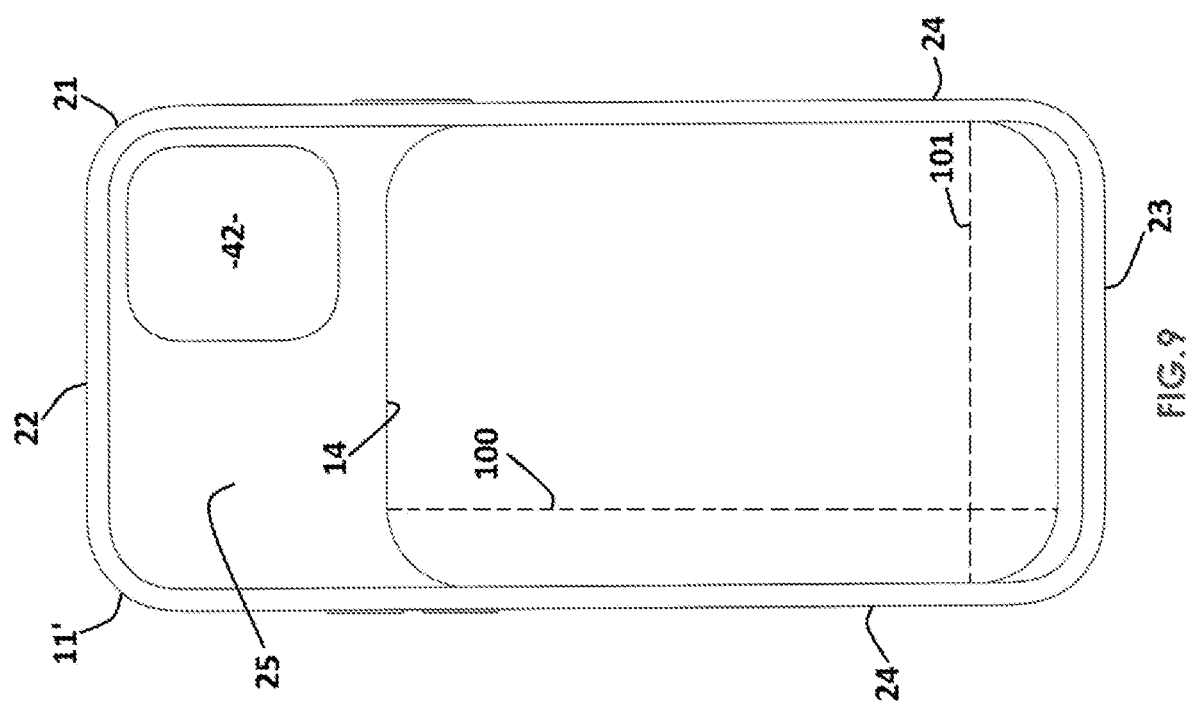
FIG. 9 is an anterior plan view of a second preferred embodiment of the device-receiving body formation of a second preferred mobile communications device case assembly according to the present invention.
Figures 11, 12:
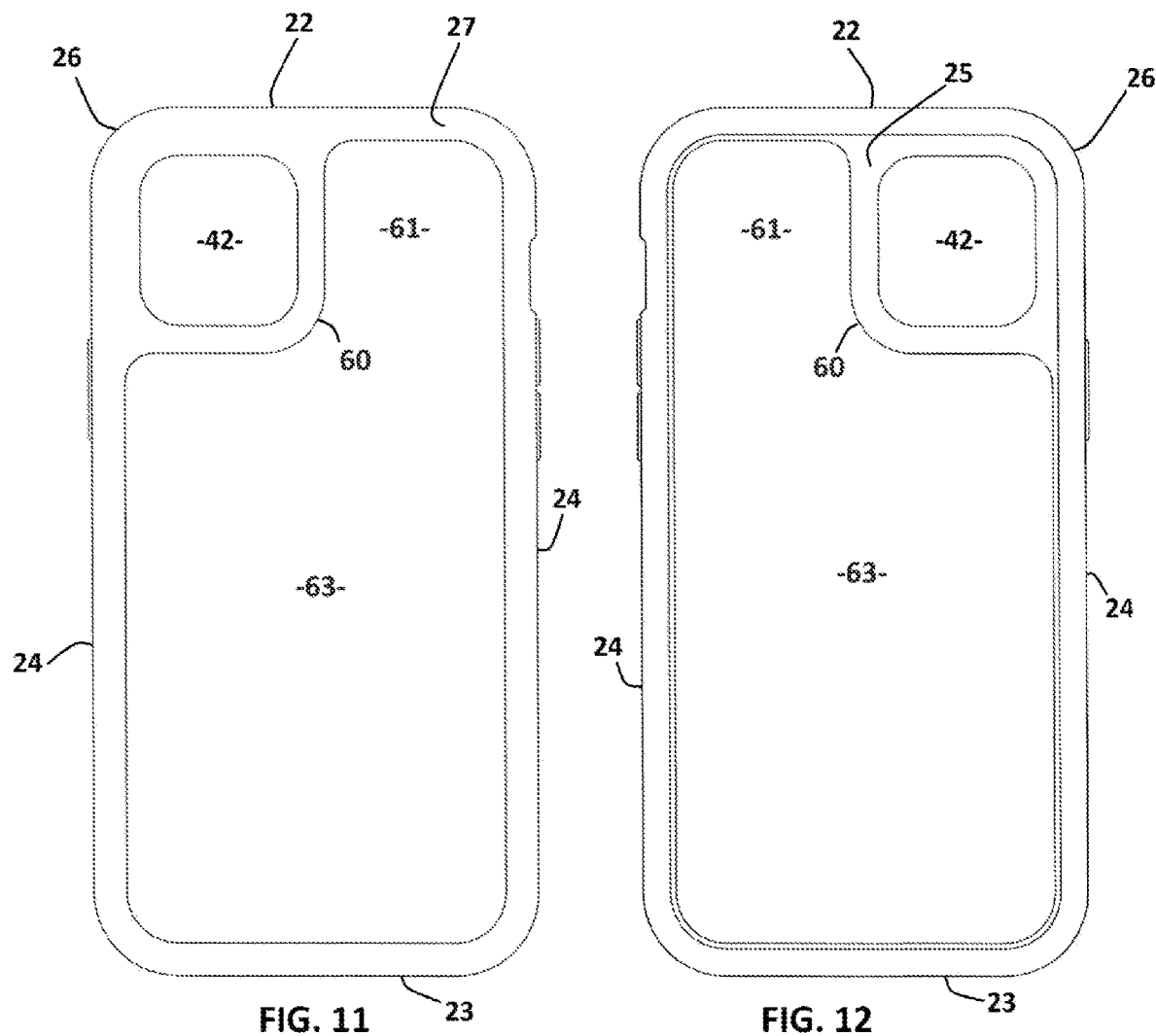
FIG. 11 is a posterior plan view of a third preferred embodiment of a device-receiving body formation of a third preferred mobile communications device case assembly according to the present invention.
FIG. 12 is an anterior plan view of the third preferred embodiment of the device-receiving body formation of the third preferred mobile communications device case assembly according to the present invention.
Figure 13:
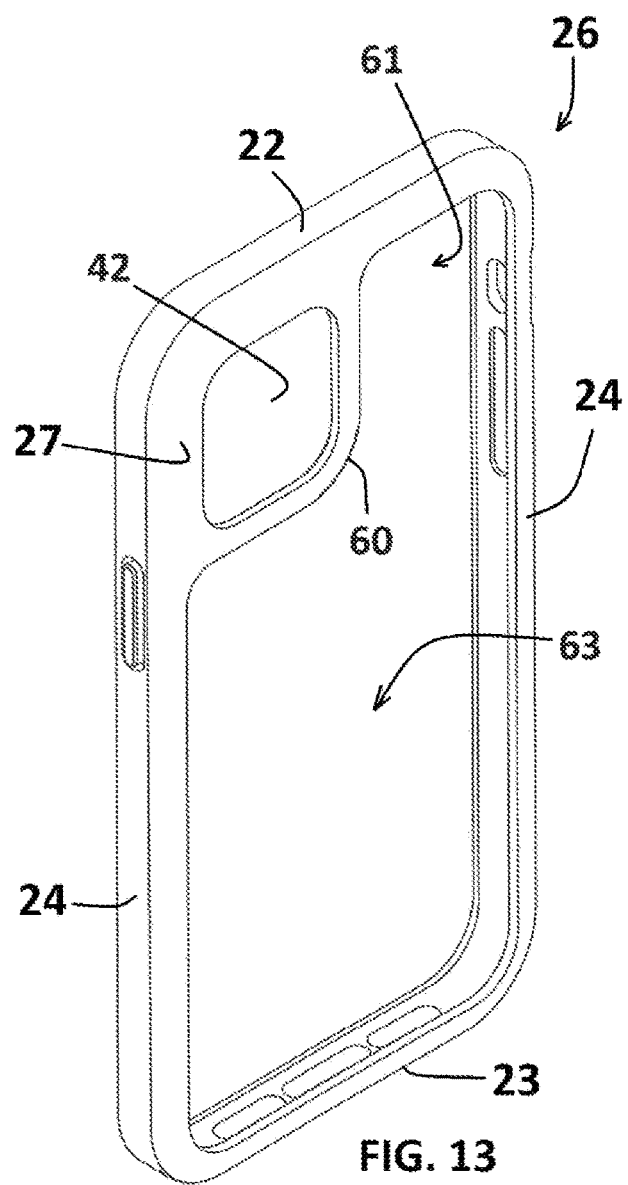
FIG. 13 is a top posterior perspective view of the third preferred embodiment of the device-receiving body formation of the third preferred mobile communications device case assembly according to the present invention.
Figure 14:
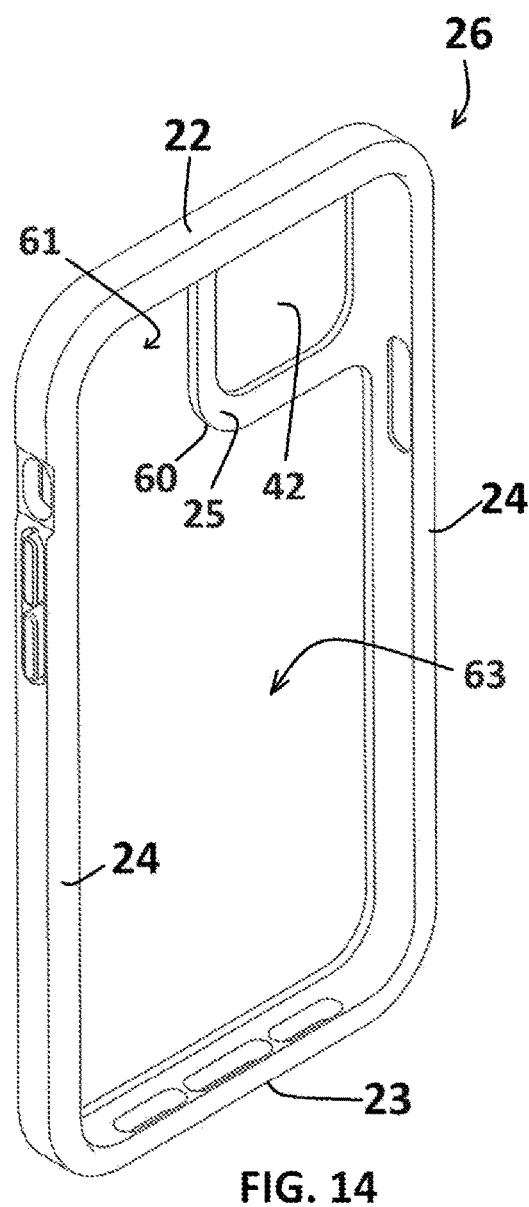
FIG. 14 is a top anterior perspective view of the third preferred embodiment of the device-receiving body formation of the third preferred mobile communications device case assembly according to the present invention.
Figure 15:
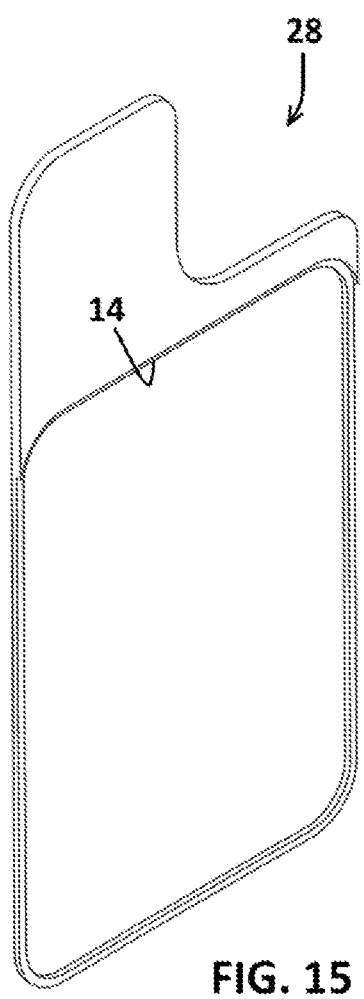
FIG. 15 is a top posterior perspective view of a posterior panel portion of the third preferred mobile communications device case assembly according to the present invention.
Figure 16:
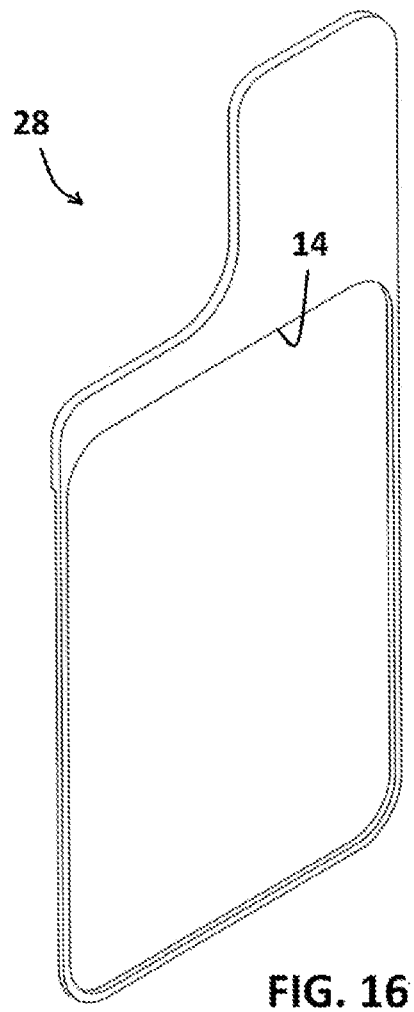
FIG. 16 is a top anterior perspective view of the posterior panel portion of the third preferred mobile communications device case assembly according to the present invention.
Figure 30:
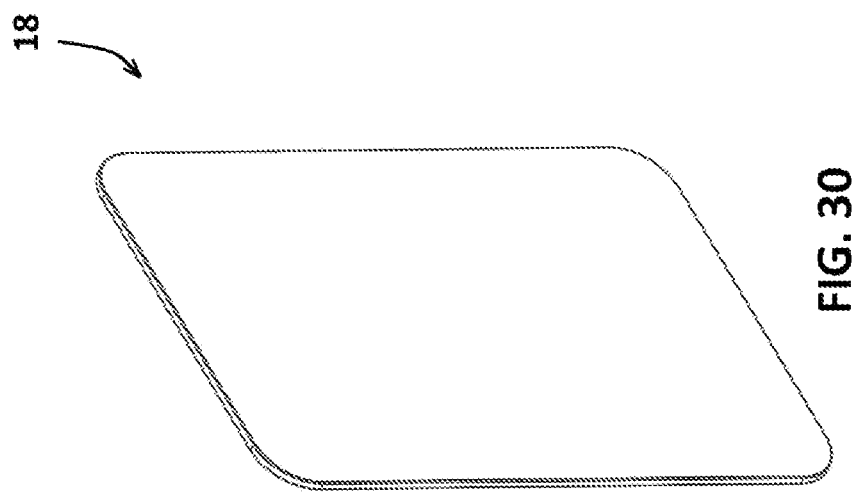
FIG. 30 is a top posterior perspective view of the removable panel usable in combination with all mobile communications device case assemblies according to the present invention.
Figure 29:
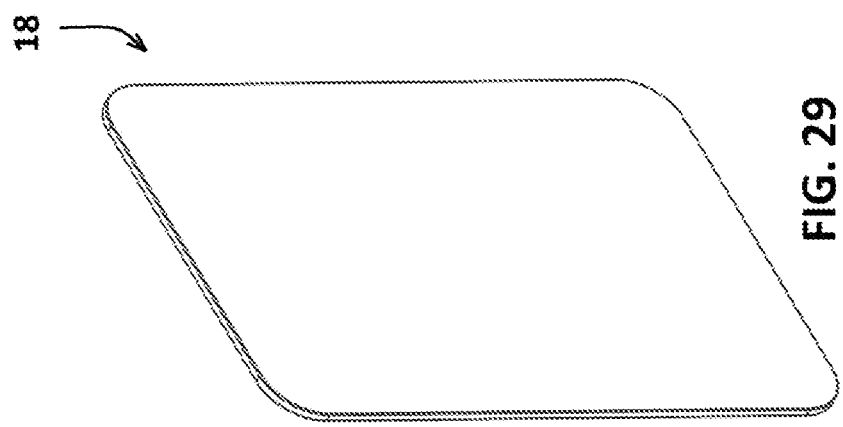
FIG. 29 is a top anterior perspective view of the removable panel usable in combination with all mobile communications device case assemblies according to the present invention.

A second preferred embodiment of the casing or case assembly according to the present invention is generally depicted and referenced at 11' in FIGS. 9 and 10. The primary structural difference between the second preferred embodiment of the casing 11' and the casing 11 are the relative dimensions of the accessory access window 14. The accessory access window 14 of the casing 11' is relatively larger than the accessory access window 14 of the casing 14 as the reader will generally see when a comparative inspection of FIGS. 1 and 2 versus FIGS. 9 and 10 is undertaken. The difference in dimensional sizing for the accessory access window 14 is meant to be illustrative of how differing cases may be developed to achieve similar functions for outfitting differing mobile communications devices 10 and not meant to be limiting on the scope of the invention here being described.

Further comparatively referencing FIGS. 1 and 2 versus FIGS. 9 and 10, the reader will there note that the accessory access window 14 of both casing 11 and casing 11' preferably comprise a top-to-bottom window height as at 100 and a side-to-side window width as at 101. The window height 100 and the window width 101 are preferably dimensioned so as to be easily receptive of a charger device 15 having a certain device diameter as at 102. In other words, the window height 100 and the window width 101 are preferably greater in dimension that the device diameter 102 for enabling the user to more easily interface the charging device 15 with the mobile communications device 10 as received in the primary device-receiving body formation 21 in anterior adjacency to the accessory access window 14.

Figure 31:
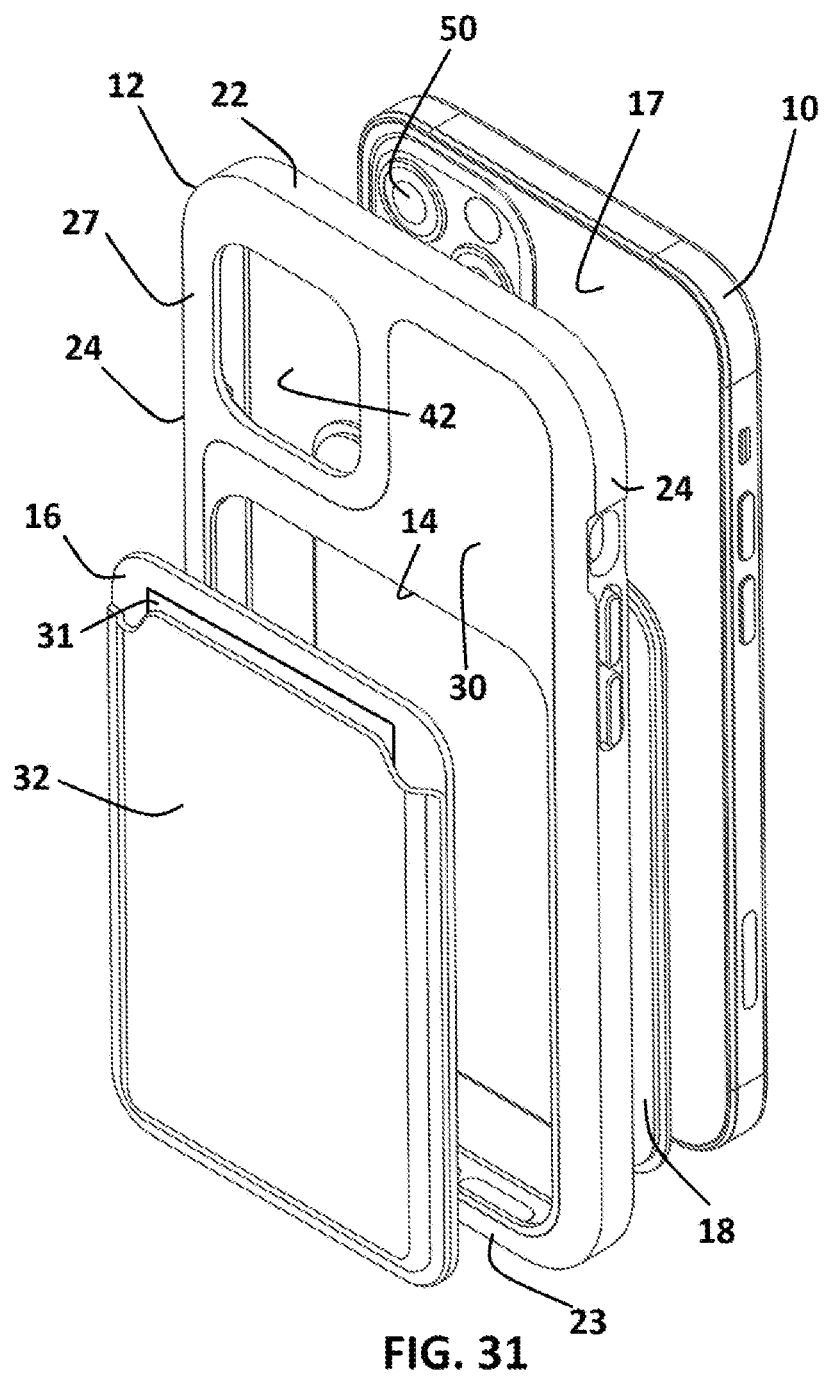
FIG. 31 is an exploded top posterior perspective view of a series of components of the third preferred mobile communications device case assembly according to the present invention as exploded from a mobile communications device.
Figure 32:
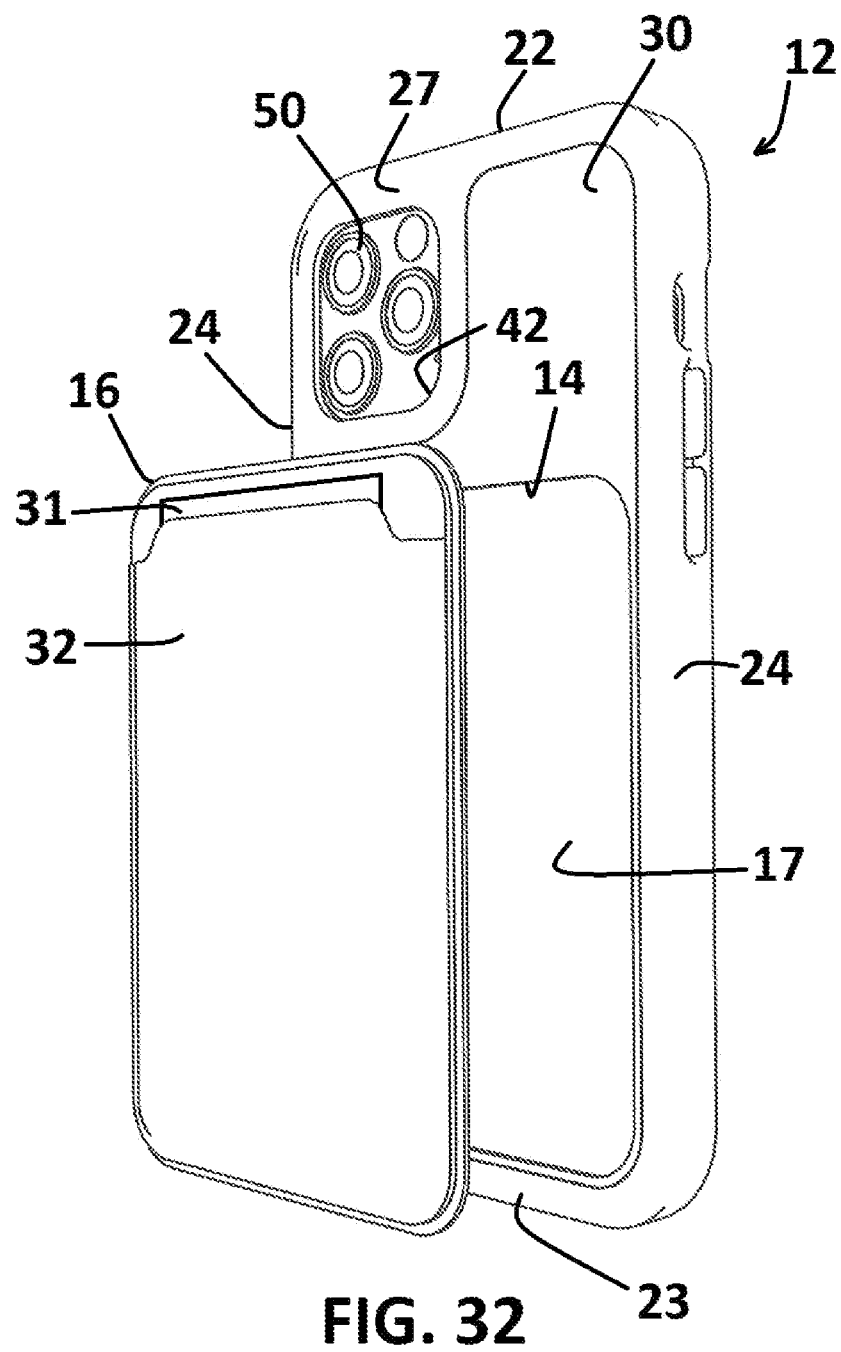
FIG. 32 is an exploded posterior perspective view of a first wallet accessory and a mobile communications device outfitted with the third preferred mobile communications device case assembly according to the present invention.
Figure 33:
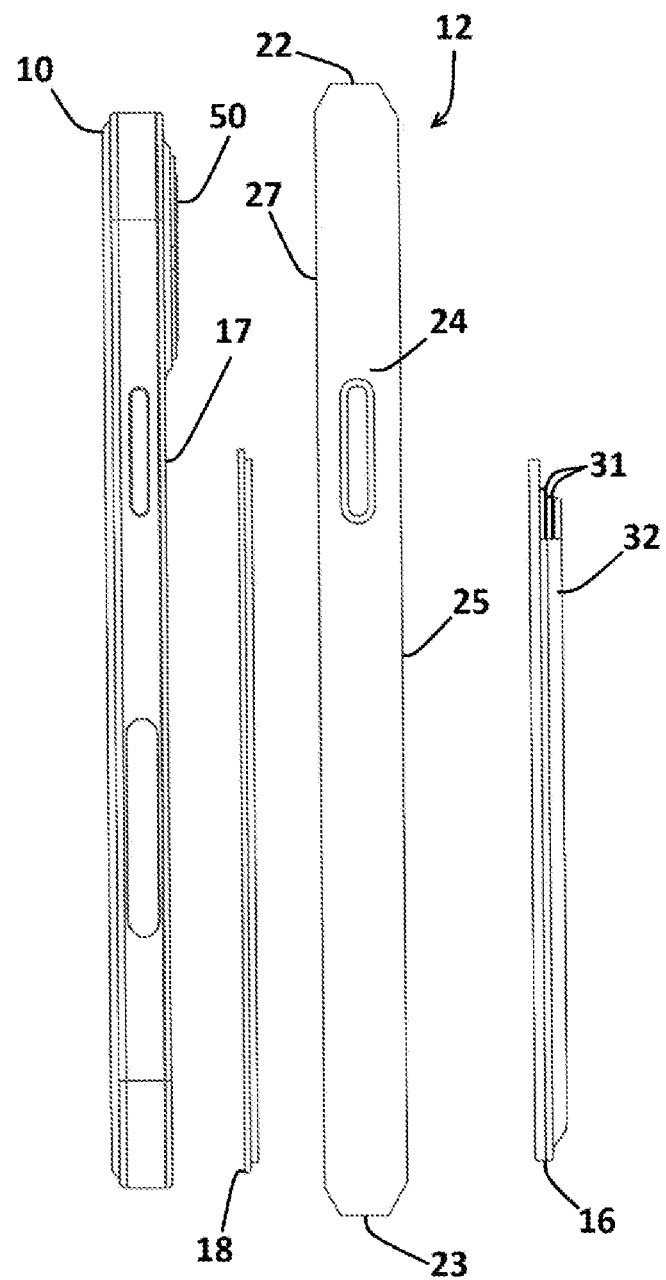
FIG. 33 is an exploded side elevational view of a series of components of the third preferred mobile communications device case assembly according to the present invention as exploded from a mobile communications device showing from left to right the mobile communications device, a removal panel, the third preferred mobile communications device case assembly, and the first wallet accessory.

Referencing FIG. 11-30, the reader will there consider a number of components that are incorporated into the third preferred embodiment or case assembly 12 according to the present invention where the case assembly 12 is shown in exploded form in FIG. 31-33. The case assembly 12 essentially comprises a primary device-receiving body formation as at 26 in FIG. 11-14 and a posterior panel portion or accessory window insert as at 28 in FIG. 15-21.

As with the primary device-receiving body formation 21, the primary device-receiving body formation 26 preferably comprises a top portion 22, a bottom portion 23, laterally opposed side portions 24, an anterior device-receiving portion 25, and a posterior device-protecting portion as at 27. The reader will note the structural difference between posterior device-protecting portions 19 and 27 in that the former portion 19 provides extended or added posterior formation surfacing 29 adjacent the top portion 22 as compared to the latter portion 27. Together the anterior device-receiving portion 25 and posterior device-protecting portion 27 extend inwardly relative to the top portion 22 and a first side portion 24 of the laterally opposed side portions 24 into an inner space 63 defined by the top portion 22, bottom portion 23, and laterally opposed side portions 24 thereby providing an aperture-defining frame portion 60 and defining an upper open portion 61 of the inner space 63 in lateral adjacency to the aperture-defining frame portion 60 intermediate a second side portion 24 of the laterally opposed side portions 24.

The posterior panel portion or accessory window insert 28 is positioned and attached at the posterior device-protecting portion 27 and provides a tab feature as at 30, which tab feature 30 provides the added surface structure otherwise eliminated from the posterior device-protecting portion 27 as compared to added posterior formation surfacing 29 coextensively extending from posterior device-protecting portion 19. The posterior panel portion or accessory window insert 28 preferably further comprises or provides an accessory access window as at 14.

The tab feature 30 extends upwardly from the accessory access window 14. When the posterior panel portion 28 is attached at the posterior device-protecting portion 27, the tab feature 30 is received in the upper open portion 61 thereby providing surface structure that covers the upper open portion 61. As earlier described, the accessory access window 14 is preferably configured to allow a user to interface charging device 15 with the mobile communications device 10 as received in the device-receiving body formation 26 in anterior adjacency to the posterior panel portion 28.

The reader will please note that the primary device-receiving body formations as here exemplified by the primary device-receiving body formation 26 are preferably formed from a first material construction, preferably opaque and of a preferred coloration while the posterior panel portion 28 may preferably be formed from a second material construction, and may be either opaque with the first coloration, a second coloration or translucent for enabling the user to see the posterior surface 17 of the mobile communications device 10 (typically also having a preferred coloration). The removable panel 18 of the second preferred embodiment or case assembly 12 may also preferably be formed from the second material construction having like coloration or be translucent as the user may desire.

It will thus be seen that all of the casing or case assembly embodiments as denoted at 11, 11', and 12 provide a cutout or accessory access window 14 formed in the back or posterior portion of the case or case assembly. Various accessories, as exemplified by a magnetically or adhesively attachable wallet type accessory 16, may thus be received within or at the accessory access window 14 or cutout while the mobile communications device 10 is received in or outfitted by the casing or case assemblies 11, 11' and 12. The overall thickness of the ensemble is thereby reduced by eliminating the thickness of case material at the accessory access window 14. Additionally, the cutout or accessory access window 14 helps prevent inadvertent removal of the accessory from the posterior surface 17 of the mobile communications device 10 by preventing direct access to the edges of the various accessories as received at the accessory access window 14.

All embodiments may further include a cover or removable panel element as at 18, which may be removed when the user wants to utilize the accessory access window 14 for receiving an accessory as exemplified by a magnetically or adhesively attachable wallet accessory 16, and replace the cover or panel element 18 when the user does not utilize the accessory for improving the posterior surface-protective characteristics of the various embodiments. The third preferred embodiment 12 enables all the functionality of the first and second preferred embodiments 11 and 11' while further enabling the user to view the posterior surface 17 of the outfitted mobile communications device 10 when optional translucent materials are utilized as hereinabove described.

FIG. 31-33 variously depict the wallet type accessory 16 in exploded relation to the third preferred embodiment 12 with mobile communications device 10 also depicted in exploded relation in FIGS. 31 and 33. The optional cover or panel element 18 is further depicted in FIGS. 31 and 33. The reader will note that the panel element 18 is not attached to the third preferred embodiment 12 while the user wishes to attach the wallet accessory 16 to the mobile communications device 10 via the accessory access window 14. The wallet accessory 16 is depicted and presented as being an exemplary accessory attachable to the posterior surface 17 of the mobile communications device 10 and provides not only device protection but also an ability to store articles (e.g. a credit card 31) within a pocket formation as at 32.

A basic wallet type accessory is depicted and referenced at 16 in FIG. 34-41 in addition to or as reflective of the wallet accessory 16 shown in FIG. 31-33. A first preferred wallet accessory according to the present invention is depicted and referenced at 33 in FIG. 42-46 and a second preferred wallet accessory according to the present invention is depicted and referenced at 34 in FIG. 47-50. All wallet type accessories according to the present invention are preferably magnetically or adhesively attachable to the posterior surface 17 of a mobile communications device 10 and as such may or may not be used in combination with a case or case assembly according to the present invention.

Comparatively referencing FIG. 42-46 in connection with the first preferred wallet accessory 33, the reader will there see a wallet accessory having a plurality of foldable panels as at 35 and a pocket flap as at 36. The foldable panels 35 enable the user to selectively open a pocket portion of the wallet accessory at the pocket flap 36 and either position the panels 35 into a position for supporting a portrait orientation of the outfitted assembly or a landscape orientation of the outfitted assembly.

Figure 46:
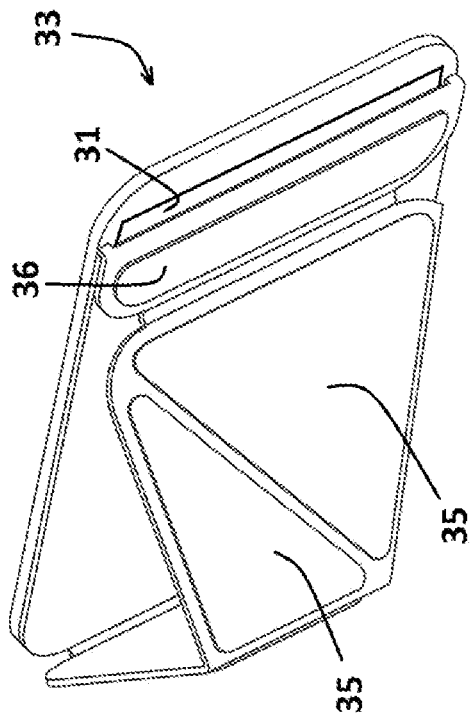
FIG. 46 is a posterior top perspective view of the second wallet accessory according to the present invention shown in a landscape orientation condition of use.
Figure 45:
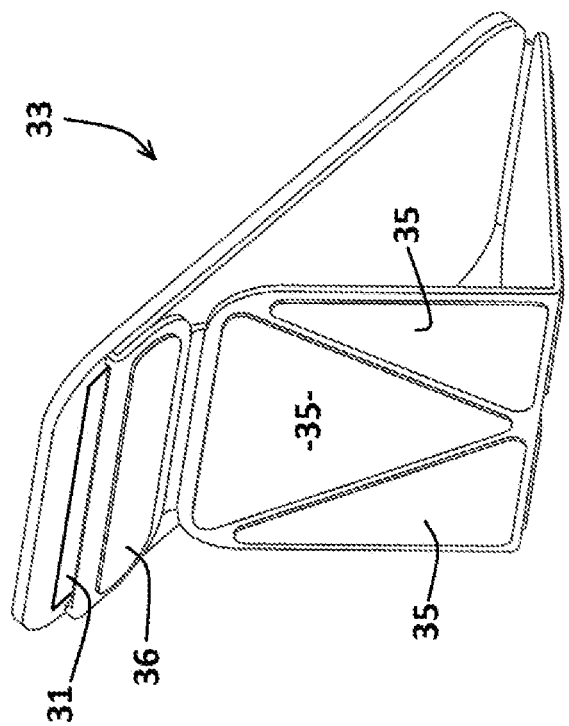
FIG. 45 is a posterior top perspective view of the second wallet accessory according to the present invention shown in a portrait orientation condition of use.
Figure 50:
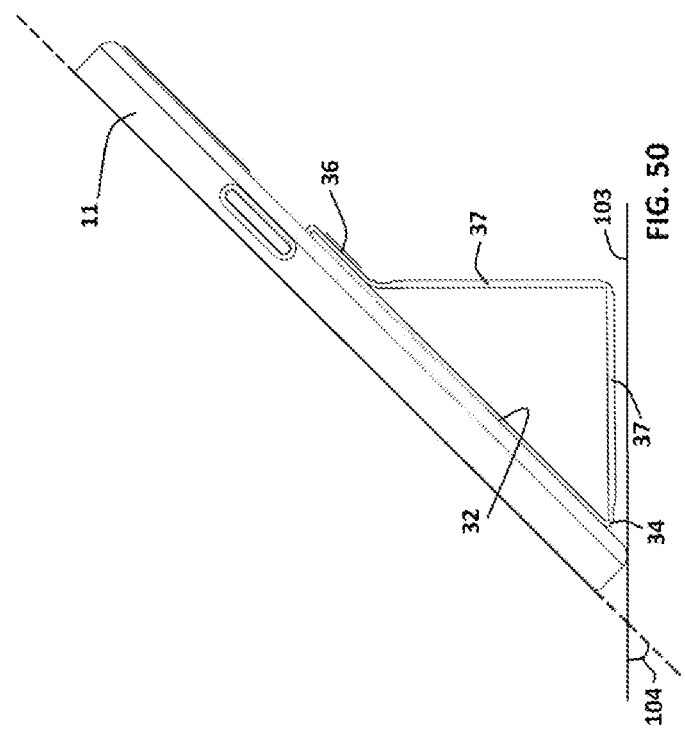
FIG. 50 is a side elevational view of the third wallet accessory according to the present invention shown in the portrait orientation condition of use.
Figure 49:
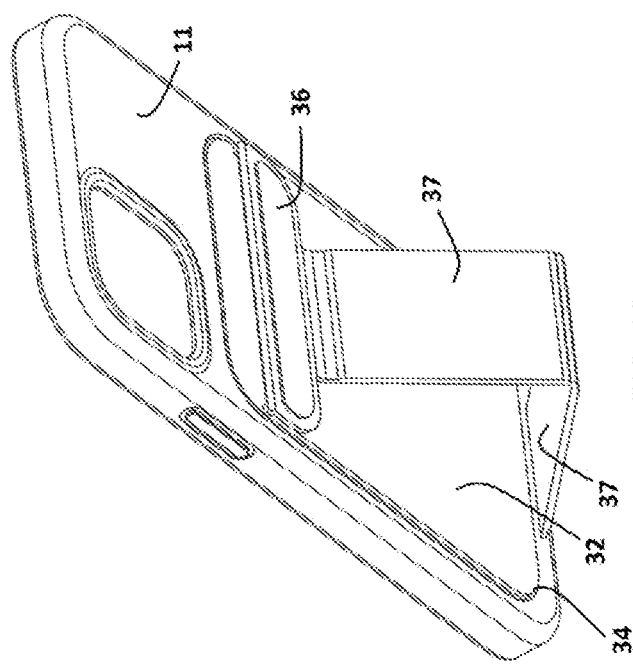
FIG. 49 is a posterior perspective view of the third wallet accessory according to the present invention shown in a portrait orientation condition of use.

The portrait orientation of the wallet accessory 33 for supporting an outfitted assembly is generally and comparatively depicted in FIGS. 43 and 45 while the landscape orientation of the wallet accessory 33 for supporting an outfitted assembly is generally and comparatively depicted in FIGS. 44 and 46. It will thus be understood that the panels 35 may operate as a kickstand type feature for enabling the user to display the mobile communications device 10 as received within the device-receiving body formation at an oblique angle 104 relative to a support surface 103.

Comparatively referencing FIG. 47-50 in connection with the second preferred wallet accessory 34, the reader will there see a wallet accessory having a plurality of foldable panels as at 37 and a pocket flap as at 36. The foldable panels 37 enable the user to selectively open a pocket portion of the wallet accessory at the pocket flap 36 and either position the panels 37 into a position for supporting a portrait orientation of the outfitted assembly or a landscape orientation of the outfitted assembly. The portrait orientation of the wallet accessory 34 for supporting an outfitted assembly is generally and comparatively depicted in FIGS. 49 and 50.

Although not specifically illustrated, the panels 37, being centered and relatively narrow as compared to the relatively wide pocket portion or formation 32, may operate to enable the user to place the wallet accessory 34 into a landscape orientation. It will thus be understood that the panels 37 may operate as a kickstand type feature for enabling the user to display the mobile communications device 10 as received within the device-receiving body formation at an oblique angle (as at 104) relative to a support surface 103 as generally depicted and referenced in FIG. 50.

Referencing FIG. 51-55, the reader will there consider a fourth preferred embodiment of a case assembly according to the present invention. The fourth preferred case assembly is referenced at 38 and preferably comprises a primary device-receiving body formation as at 39. The primary device-receiving body formation 39 preferably comprises a top portion 22, a bottom portion 23, laterally opposed side portions 24, an anterior device-receiving portion, and a posterior device-protecting portion as at 40. The posterior device-protecting portion 40 comprises a crossmember as at 41, which extends intermediate the laterally opposed side portions 24.

The accessary access window 14 is directly below the crossmember 41 with a (device lens 50) aperture feature as at 42 directly above the crossmember 41. The aperture feature 42 enables the user to take photographs via the mobile communications device 10 as received within the device-receiving body formation 38. Adjacent the aperture feature 42 and above the crossmember 41 there is a recessed material formation as at 43. The recessed material formation 43 may preferably receive an ornamental lens surround as at 44, which ornamental lens surround 44 further accessorizes the case assembly 38. The lens surround 44 also preferably comprises a surround aperture as at 45 configured to substantially mimic the aperture feature 42 for enabling the described functionality.

The fourth preferred case assembly 38 is shown with a case mount or vehicular mount mechanism 46 that is configured to be received at the accessory access aperture 14. The vehicular mount mechanism 46 is an additional type of accessory that may be used in combination with all embodiments according to the present invention, and is preferably magnetically attachable to the posterior surface 17 of the mobile communications device 10 via an interface portion 47 configured to substantially fill the accessory access window 14. The reader will further note that all embodiments according to the present invention preferably comprise the (device lens 50) aperture feature 42.

Figure 53:
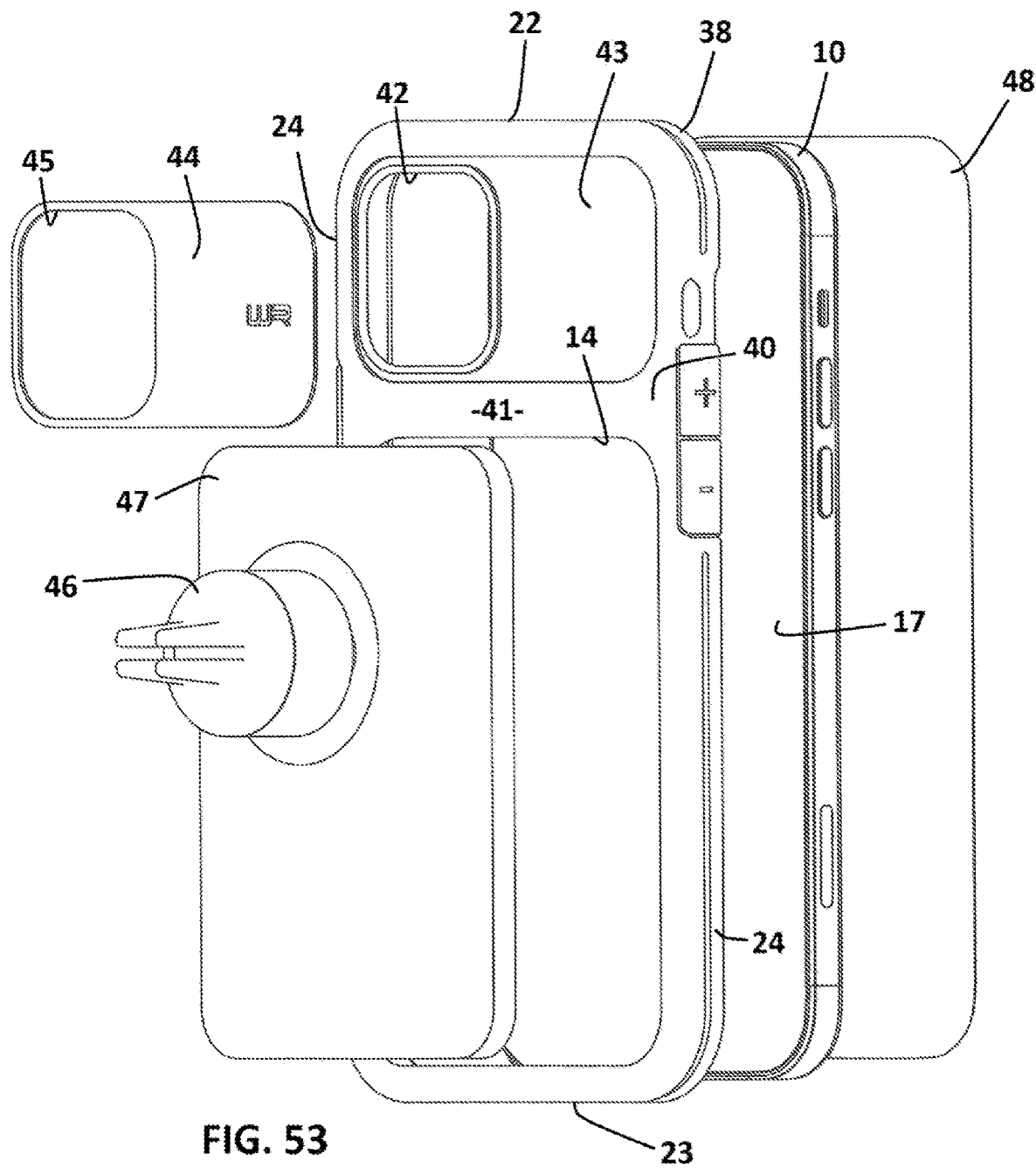
FIG. 53 is an exploded posterior perspective view of the fourth preferred mobile communications device case assembly with car vent mount accessory and ornamental lens surround exploded therefrom juxtaposed adjacent a mobile communications device and a scratch resistant thin film panel.
Figure 54:
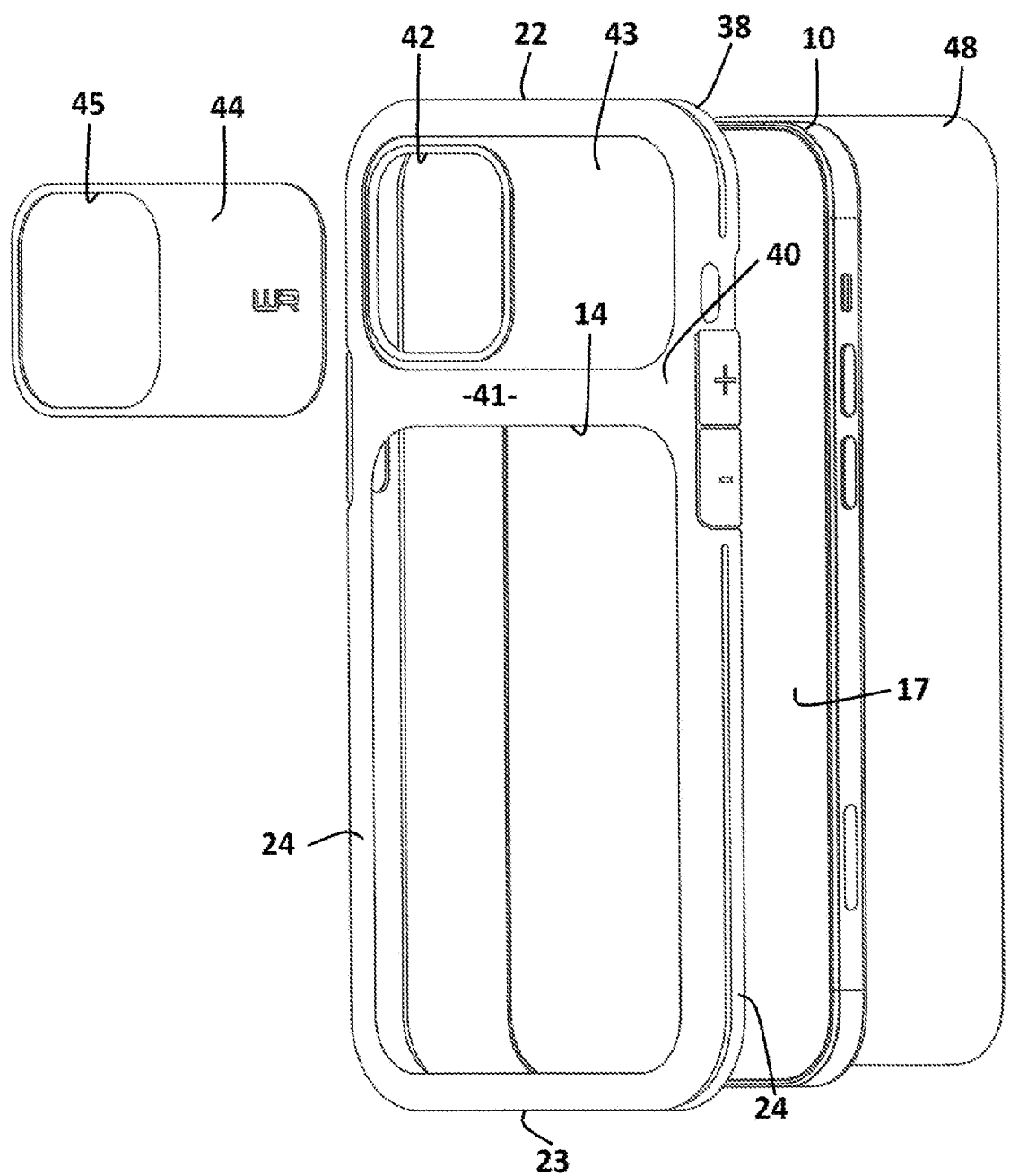
FIG. 54 is an exploded posterior perspective view of the fourth preferred mobile communications device case assembly with ornamental lens surround juxtaposed adjacent a mobile communications device and a scratch resistant thin film panel.
Figure 55:
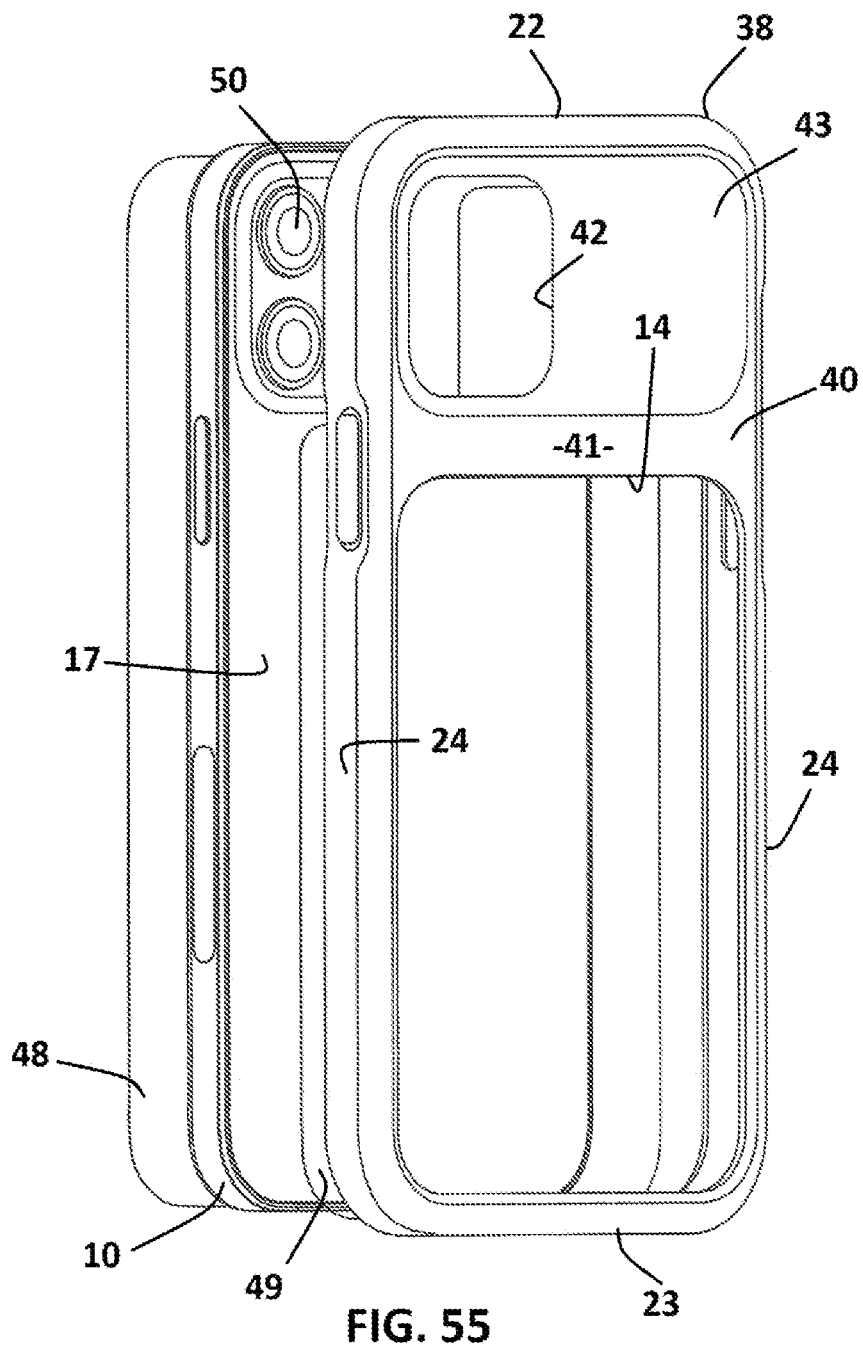
FIG. 55 is an exploded posterior perspective view of the fourth preferred mobile communications device case assembly juxtaposed adjacent a mobile communications device and first and second scratch resistant thin film panels.
Figure 57:
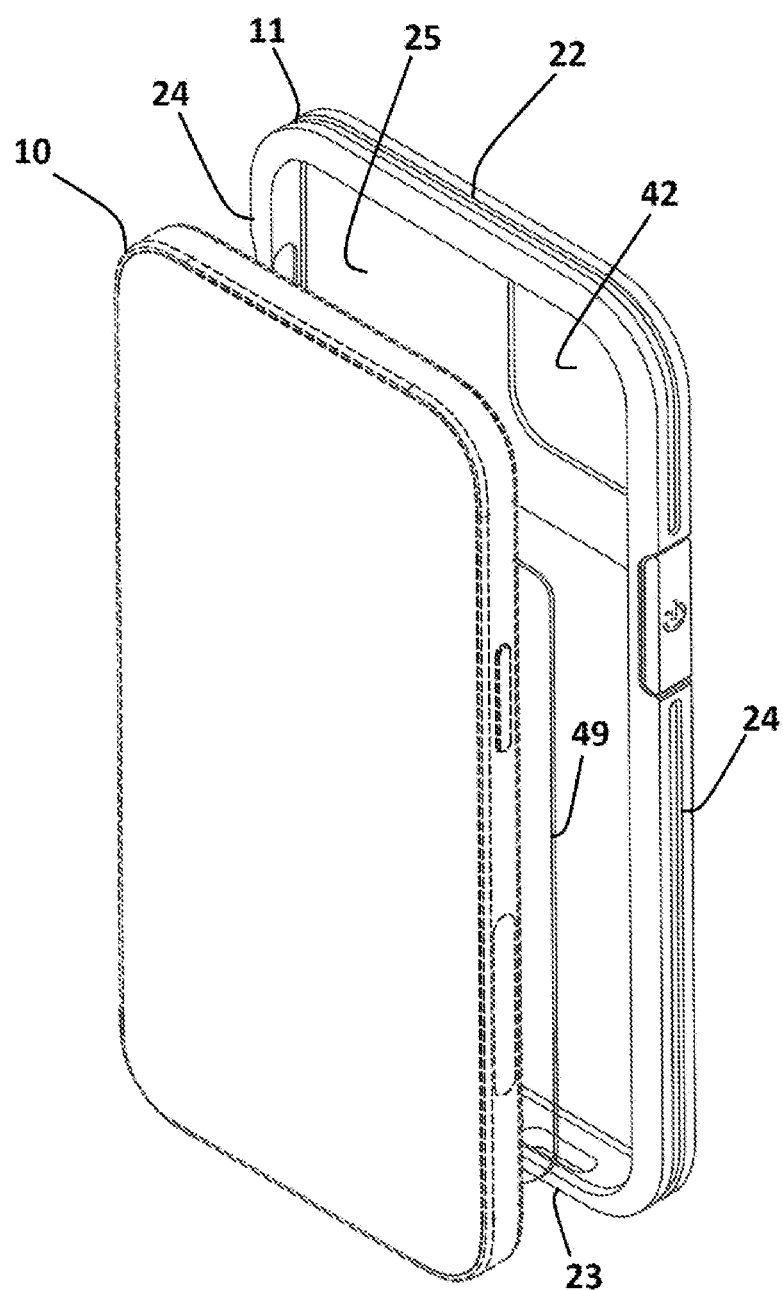
FIG. 57 is an exploded top anterior perspective view of the first preferred mobile communications device case assembly juxtaposed adjacent a mobile communications device showing a scratch resistant thin film panel.

Referencing FIG. 53-55, the reader will there consider a first scratch-resisting thin film panel as at 48. The first scratch-resisting thin film panel 48 is applicable to the anterior surfacing of the mobile communications device 10 for protecting the anterior surfacing, and may be used in combination with all embodiments according to the present invention. FIGS. 55 and 57 further illustrate or depict a second scratch-resisting thin film panel as at 49. The second scratch-resisting thin film panel 49 is applicable intermediate the posterior surfacing 17 of the mobile communications device 10 and the anterior device-receiving portion for protecting the posterior surfacing 17, and may also be used in combination with all embodiments according to the present invention.

Figure 56:
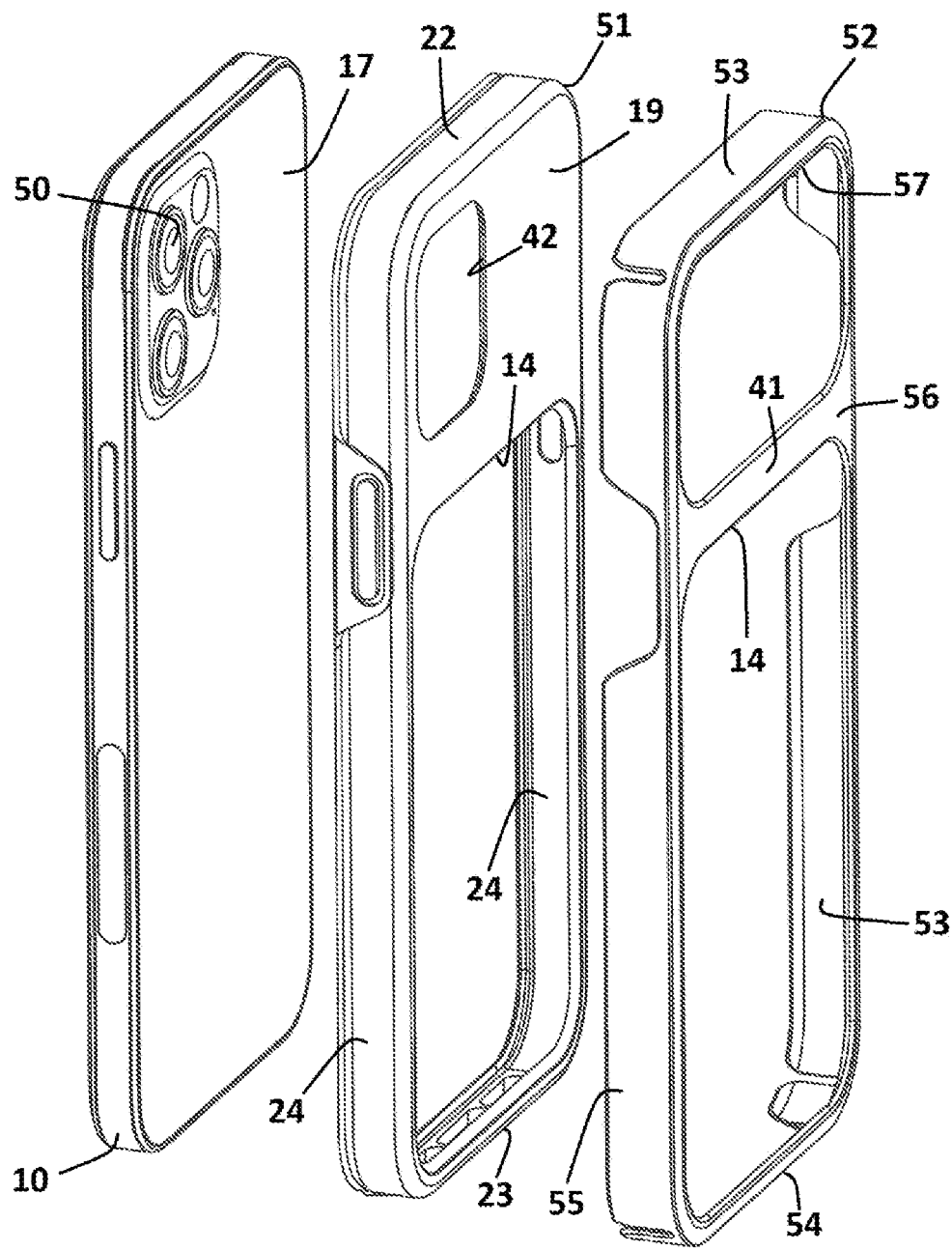
FIG. 56 is an exploded top posterior perspective view of a fifth preferred mobile communications device case assembly juxtaposed adjacent a mobile communications device and showing a primary device-receiving formation and a secondary body formation.

Referencing FIG. 56, the reader will the consider a fifth preferred embodiment of a case assembly according to the present invention. The fifth preferred case assembly preferably comprises a primary device-receiving body formation as at 51 and a secondary body formation or outer skin as at 52. The primary device-receiving body formation 51 is substantially similar to primary device-receiving body formation 21 and thus preferably also comprises a top portion 22, a bottom portion 23, laterally opposed side portions 24, an anterior device-receiving portion, a posterior device-protecting portion 19, and an accessory access window 14.

As earlier described, the reader will note that the primary device-receiving body formation 51 is preferably formed from a first material construction (e.g. Thermoplastic Polyurethane) preferably having a first coloration while the secondary body formation or outer skin 52 may preferably be formed from a second material construction (e.g. aluminum) and have complementary or second coloration for further accessorizing the fifth case assembly according to the present invention. Although not specifically illustrated, the present invention contemplates case assemblies having additional or tertiary outer layers or skins for variously accessorizing the case assembly.

The secondary body formation 52 preferably comprises a top portion 53, a bottom portion 54, laterally opposed side portions 55, an anterior device-receiving portion, a posterior device-protecting portion 56, and an accessory access window 14. The posterior device-protecting portion 56 preferably comprises a crossmember 41 defining an upper aperture as at 57 and an upper portion of the accessory access window 14. The first coloration of the primary device-receiving body formation 51 or posterior device-protecting portion 19 is visible via the upper aperture 57. Various other similar structural features enable a layering of materials and colors enable the user to further accessorize the case assemblies according to the present invention.

While the above descriptions contain much specificity, this specificity should not be construed as limitations on the scope of the invention, but rather as an exemplification of the invention. In certain embodiments, the basic invention may be said to essentially teach or disclose a casing or case assembly for a mobile communications device case. In a first aspect, the case assembly according to the present invention preferably comprises a primary device-receiving body formation, and a posterior panel portion or accessory window insert element.

The primary device-receiving body formation comprises a top portion, a bottom portion, laterally opposed side portions, an anterior device-receiving portion, and a posterior device-protecting portion. The posterior panel portion or accessory window insert is positioned at the posterior device-protecting portion and comprises an accessory access window. The accessory access window is configured to primarily allow a user to interface a charging device with the mobile communications device as received in the device-receiving body formation in anterior adjacency to the posterior panel portion or accessory window insert element.

The case assembly may further preferably comprise an assembly accessory configured to cover or close the accessory access window. In this regard, the cover or panel element 18; the wallet accessories 16, 33, and 34; and the vehicular mount mechanism 46 may all exemplify an assembly accessory according to the present invention. When exemplified by the cover or panel, the assembly accessory may be said to allow the charger device 15 to charge the mobile communications device via a material construction of the assembly accessory. In other words, the charger device may be magnetically attached to the panel and be operable to charge the communications device via the panel as generally depicted in connection with the embodiment shown in FIG. 1.

The posterior panel portion and the assembly accessory may be preferably formed from visually identical material(s). The visually identical material(s) provide a uniform visual appearance of the mobile communications device case assembly when viewed posteriorly. The device-receiving body formation and the assembly accessory may also be formed from visually identical material(s) for providing a uniform visual appearance of the mobile communications device case assembly when viewed posteriorly. When exemplified by a wallet accessory, the assembly accessory comprises a pocket formation as at 32. The pocket formation enables the user to store at least one article (credit card) in adjacency to the accessory access window.

When the assembly accessory is exemplified by either wallet accessory 33 or wallet accessory 34, the assembly accessory may be said to provide a kickstand feature. The kickstand feature enables the user to display the mobile communications device as received within the device-receiving body formation at an oblique angle (as at angle 104) relative to a support surface 103. The kickstand feature may further enable the user to display the mobile communications device in either a landscape orientation or a portrait orientation as comparatively depicted in FIGS. 45, 46, 49, and 50. Recalling the fifth embodiment of the case assembly, the same may be said to comprise at least one secondary body formation as at 52. The at least one secondary body formation is preferably configured to receive the primary device-receiving body formation as an outer skin thereof.

The case assembly may also be used in combination with a case mount as at vehicular mount mechanism 46. The case mount preferably comprises a window interface portion, which window interface of the case mount closes the accessory access window and is operable to mount the case assembly to a support structure (exemplified by a vehicular vent or similar other vehicular support structure). The case assembly may further preferably comprises at least one thin film panel as at panels 48 and 49 for providing scratch resistance protection to the mobile communications device. The at least one thin film panel is attachable to the primary device-receiving body formation at the anterior device-receiving portion for interfacing intermediate articles received at the accessary access window and the posterior surface of the mobile communications device as also received at the anterior device-receiving portion.

Although the case assemblies according to the present invention have been described by reference to a number of different embodiments, aspects, and features, it is not intended that the novel apparatus be limited thereby, but that modifications thereof are intended to be included as falling within the broad scope and spirit of the foregoing disclosure, the appended drawings, and the following claims.

What is claimed is:

1. A case assembly for a mobile communications device case, the case assembly comprising:
   a primary device-receiving body formation, the primary device-receiving body formation comprising a top portion, a bottom portion, laterally opposed side portions, an anterior device-receiving portion, and a posterior device-protecting portion, the anterior device-receiving portion and the posterior device-protecting portion together extending inwardly relative to the top portion and a first side portion of the laterally opposed side portions into a space defined by the top portion, bottom portion, and laterally opposed side portions thereby providing an aperture-defining frame portion and defining an upper open portion in lateral adjacency to the aperture-defining frame portion intermediate a second side portion of the laterally opposed side portions; and a posterior panel portion, the posterior panel portion comprising a tab feature and accessory access window, the tab feature extending upwardly from the accessory access window, the posterior panel portion being attached at the posterior device-protecting portion such that the tab feature is received in the upper open portion thereby providing surface structure that covers the upper open portion, the accessory access window being configured to allow a user to interface a charging device with the mobile communications device as received in the device-receiving body formation in anterior adjacency to the posterior panel portion.

2. The case assembly of claim 1 wherein the accessory access window comprises a top-to-bottom window length and a side-to-side window width, the charging device comprising a device diameter, the window height and the window width being greater in dimension that the device diameter for enabling the user to more easily interface the charging device with the mobile communications device as received in the primary device-receiving body formation.

3. The case assembly of claim 1 comprising an assembly accessory, the assembly accessory being configured to close the accessory access window.

4. The case assembly of claim 3 wherein the assembly accessory comprises a pocket formation, the pocket formation for enabling the user to store at least one article in adjacency to the accessory access window.

5. The case assembly of claim 3 wherein the assembly accessory provides a kickstand feature, the kickstand feature for enabling the user to display the mobile communications device as received within the primary device-receiving body formation at an oblique angle relative to a support surface.

6. The case assembly of claim 5 wherein the kickstand feature enables the user to display the mobile communications device in either a landscape orientation or a portrait orientation.

7. The case assembly of claim 1 wherein the primary device-receiving body formation provides a device lens aperture feature, the device lens aperture feature for enabling the user to take photographs via the mobile communications device as received within the primary device-receiving body formation.

8. The case assembly of claim 7 wherein a recessed material formation extends in adjacency to the device lens aperture feature, the recessed material formation for receiving an ornamental lens surround, the ornamental lens surround for accessorizing the case assembly.

9. The case assembly of claim 1 comprising at least one secondary body formation, the at least one secondary body formation being configured for receiving the primary device-receiving body formation as an outer skin thereof.

10. The case assembly of claim 1 usable in combination with a case mount, the case mount comprising a window interface, the window interface of the case mount for closing the accessory access window and mounting the case assembly to a support structure.

11. A casing for a mobile communications device, the casing comprising:

a primary device-receiving body formation, the primary device-receiving body formation comprising a top portion, a bottom portion, laterally opposed side portions, an anterior device-receiving portion, a posterior device-protecting portion, and an aperture-defining frame portion, the aperture-defining frame portion defining an upper open portion in lateral adjacency to the aperture-defining frame portion intermediate a first side portion of the laterally opposed side portions; and an accessory window insert, the accessory window insert comprising a tab feature and accessory access window, the tab feature extending upwardly from the accessory access window, the accessory window insert being attached at the posterior device-protecting portion such that the tab feature is received in the upper open portion thereby providing surface structure that covers the upper open portion, the accessory access window being configured to allow a user to interface a charging device with the mobile communications device as received in the primary device-receiving body formation.

12. The casing of claim 11 wherein the accessory access window comprises a top-to-bottom window length and a side-to-side window width, the charging device comprising a device diameter, the window height and the window width being greater in dimension that the device diameter for enabling the user to more easily interface the charging device with the mobile communications device as received in the primary device-receiving body formation.

13. The casing of claim 11 comprising an assembly accessory, the assembly accessory being configured to close the accessory access window.

14. The casing of claim 13 wherein the assembly accessory comprises a pocket formation, the pocket formation for enabling the user to store at least one article in adjacency to the accessory access window.

15. The casing of claim 13 wherein the assembly accessory provides a kickstand feature, the kickstand feature for enabling the user to display the mobile communications device as received within the primary device-receiving body formation at an oblique angle relative to a support surface.

16. The casing of claim 15 wherein the kickstand feature enables the user to display the mobile communications device in either a landscape orientation or a portrait orientation.

17. The casing of claim 11 wherein the primary device-receiving body formation provides a device lens aperture feature, the device lens aperture feature for enabling the user to take photographs via the mobile communications device as received within the primary device-receiving body formation.

18. The casing of claim 17 wherein a recessed material formation extends in adjacency to the device lens aperture feature, the recessed material formation for receiving an ornamental lens surround, the ornamental lens surround for accessorizing the case assembly.

19. The casing of claim 11 comprising at least one secondary body formation, the at least one secondary body formation being configured for receiving the primary device-receiving body formation as an outer skin thereof.

20. The casing of claim 11 usable in combination with a case mount, the case mount comprising a window interface, the window interface of the case mount for closing the accessory access window and mounting the case assembly to a support structure.

* * * * *